(12) United States Patent
Fan et al.

(10) Patent No.: US 8,976,098 B2
(45) Date of Patent: Mar. 10, 2015

(54) ADJUSTABLE VIEWING ANGLE DISPLAY DEVICE AND METHOD FOR DRIVING THE SAME

(71) Applicant: AU Optronics Corporation, Hsin-Chu (TW)

(72) Inventors: Chen-Feng Fan, Hsin-Chu (TW);
Chao-Wei Yeh, Hsin-Chu (TW);
Chih-Hsiang Yang, Hsin-Chu (TW);
Chien-Huang Liao, Hsin-Chu (TW);
Wen-Hao Hsu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 126 days.

(21) Appl. No.: 13/945,078

(22) Filed: Jul. 18, 2013

(65) Prior Publication Data
US 2014/0191933 A1   Jul. 10, 2014

(30) Foreign Application Priority Data

Jan. 7, 2013  (TW) .............................. 102100476 A

(51) Int. Cl.
*G09G 3/36* (2006.01)
*G02F 1/133* (2006.01)
(52) U.S. Cl.
CPC .............. *G02F 1/133* (2013.01); *G09G 3/3622* (2013.01); *G09G 2320/028* (2013.01); *G09G 2358/00* (2013.01)
USPC .................. 345/89; 345/88; 345/98; 345/690
(58) Field of Classification Search
CPC .......... G09G 3/3607; G09G 2320/028; G09G 2320/06; G09G 2320/0686; G09G 2320/068; G09G 2300/0448

USPC ......... 345/87–100, 204, 390; 349/84, 85, 139
See application file for complete search history.

(56) References Cited

U.S. PATENT DOCUMENTS

| | | | |
|---|---|---|---|
| 6,285,431 B2 | 9/2001 | Lyu et al. | |
| 6,646,707 B2 | 11/2003 | Noh et al. | |
| 7,692,750 B2 | 4/2010 | Jang et al. | |
| 2006/0109224 A1* | 5/2006 | Chang et al. | 345/89 |
| 2006/0267905 A1* | 11/2006 | Nishino et al. | 345/98 |
| 2010/0207862 A1 | 8/2010 | Xu et al. | |
| 2010/0231544 A1 | 9/2010 | Lu et al. | |
| 2012/0281174 A1 | 11/2012 | Yeh et al. | |
| 2012/0293750 A1 | 11/2012 | Yeh et al. | |
| 2013/0010219 A1 | 1/2013 | Yeh et al. | |

FOREIGN PATENT DOCUMENTS

| | | |
|---|---|---|
| JP | 2007-178904 | 7/2007 |
| JP | 2007-178907 | 7/2007 |

* cited by examiner

*Primary Examiner* — Regina Liang
(74) *Attorney, Agent, or Firm* — WPAT, PC; Justin King

(57) ABSTRACT

Disclosed herein is an adjustable viewing angle display device. The display device includes a display panel composed of a first substrate, a second substrate, a display medium layer interposed therebetween, a first electrode, a second electrode and a third electrode. Pluralities of sub-pixels are defined in the display panel. The first and second electrodes are disposed on the first substrate in the sub-pixels. The first electrode is spaced apart from the second electrode. The third electrode is disposed on the second substrate. When the display device is operated in a narrow viewing angle mode, there exists a non-zero potential difference between the second electrode and the third electrode, and when the sub-pixel is at gray level of zero, the potential difference between the first electrode and the second electrode is not zero. A driving method for driving the display device is disclosed as well.

18 Claims, 21 Drawing Sheets

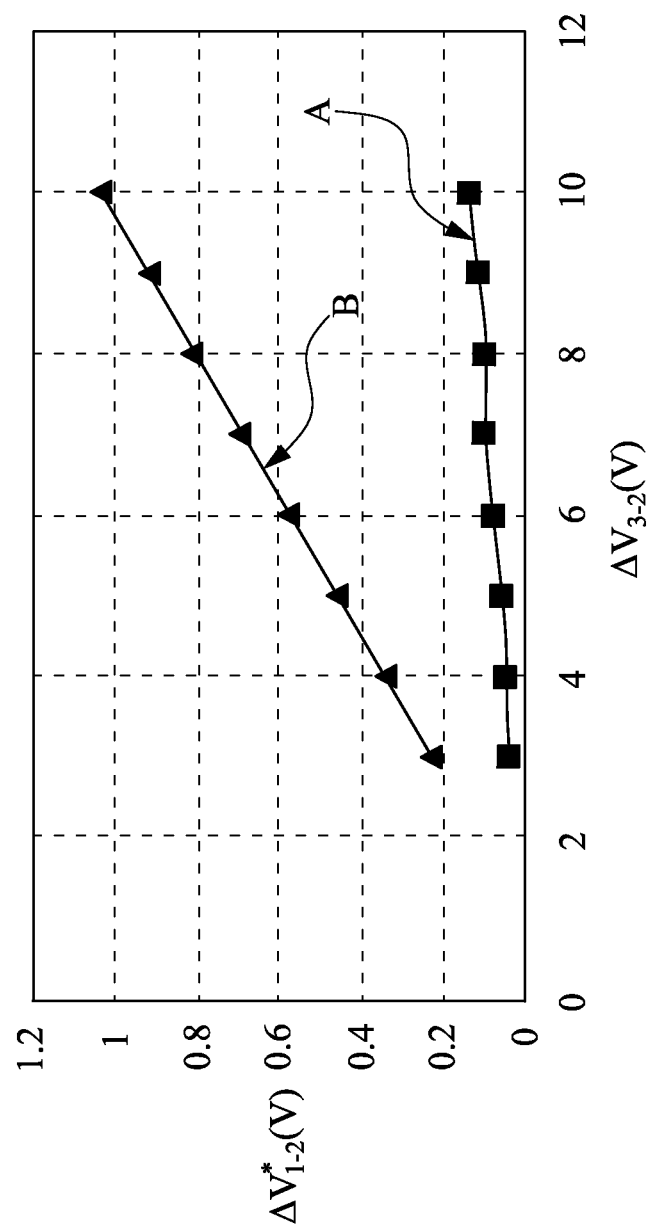

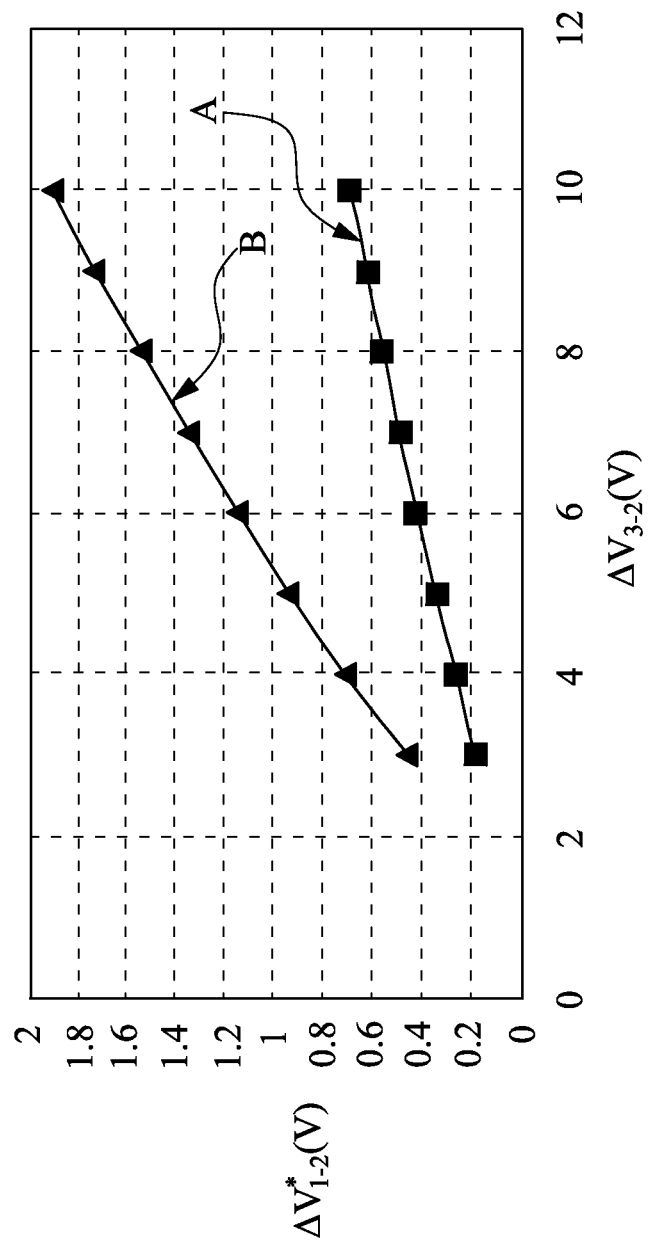

ADJUSTABLE VIEWING ANGLE DISPLAY DEVICE AND METHOD FOR DRIVING THE SAME

RELATED APPLICATIONS

This application claims priority to Taiwan Application Serial Number 102100476, filed Jan. 7, 2013, the entirety of which is incorporated herein by reference.

BACKGROUND

1. Technical Field

The present disclosure relates to an adjustable viewing angle display device, and a driving method for driving the same.

2. Description of Related Art

Generally, a display device usually has a wide viewing angle for the purpose of allowing the image to be seen for a plurality of viewers. However, at some times or in some places, for example, when reading confidential information or inputting a password, the effect of the wide viewing angle easily causes the confidential information to be peeped by other people, which causes the divulgation of the confidential information. Therefore, in order to meet two different demands, both providing the image for a plurality of viewers and treating the confidential information in public places, the display device with an adjustable viewing angle, that is switchable between a wide viewing angle display mode and a narrow viewing angle display mode, gradually becomes one of mainstream products on the display device market.

A conventional anti-peep mechanism of a display device may be substantially classified into several techniques as below:

I. Direct Installation of an Anti-Peep Sheet on an External Surface of the Display Device (Display Panel):

A typical anti-peep sheet prevents the viewers in side view from clearly reading the displayed information by inhibiting the brightness at a large viewing angle, so as to achieve the privacy protection. Although this method is easy and the material of the anti-peep sheet is common, the additional installation of one optical film affects the original on-axis optical property and display quality of to the display device. Moreover, whether to prevent peep is manually switched, resulting in much inconvenience in use of a user.

II. Control of a Backlight Source

A backlight source that emits light with high collimation is utilized. The backlight source is equipped with a voltage-controlled diffusion sheet, for example a polymer-dispersed liquid crystal (PDLC) film. When the voltage applied to the diffusion sheet is turned off, the voltage-controlled diffusion sheet diffuses the collimated light and a portion of light is directed towards the side view, so that a wide viewing angle mode is realized. When the voltage applied to the diffusion sheet is turned on, the voltage-controlled diffusion sheet does not cause diffusion of the original collimated radiation, so that a narrow viewing angle mode is achieved. In this method, the brightness for the side view is adjusted by controlling the scattering angle of the backlight such that the people positioned at the side view cannot read the displayed information. Although ideally other people can be completely prevented from peeping at the information, and the switching between the wide viewing angle mode and the narrow viewing angle mode is convenient, completely collimated light, however, cannot be achieved in an actual application due to difficulties in controlling the light path. Even though the light distribution at a large viewing angle can be decreased, but the brightness towards the large viewing angle cannot be decreased to a level of unavailable identification. Therefore, a desirable anti-peep effect cannot be obtained.

III. Additional Arrangement of a Viewing Angle Control Module Unit

A viewing angle control module (panel) is additionally disposed on a conventionally operated display module (display panel). The wide viewing to angle mode and the narrow viewing angle mode are switched by applying a voltage to the viewing angle control module. In this method, there is no interference or damage to the originally displayed image under the wide viewing angle mode, so that the quality of the original image can be kept. While in the narrow viewing angle mode, the brightness for the side view can be significantly inhibited, such that the viewers viewing from the side cannot easily judge and read the displayed message. However, due to the constitution of two modules, the overall weight and thickness are increased by one fold, and relatively increase the manufacturing costs.

In view of the above, conventional anti-peep techniques of display devices achieve anti-peep effects, but simultaneously sacrifice some of original characteristics of display devices, such as display quality, optical property, thickness and weight. Therefore, the conventional anti-peep technique still has space for improvement.

SUMMARY

The present disclosure discloses an adjustable viewing angle display device. The display device can reduce light leakage in the dark state of the display device in a narrow viewing angle mode without increasing the cost and process complexity, so as to increase the contrast of the display device in the narrow viewing angle mode.

This adjustable viewing angle display device includes a display panel comprising a first substrate, a second substrate and a non-self-luminous display medium layer. The second substrate is disposed opposite to the first substrate, and the non-self-luminous display medium layer is interposed between the first substrate and the second substrate. A pixel array is defined in the display panel, and the pixel array has at least one first pixel zone and at least one second pixel zone. Each of the first pixel zone and the second pixel zone has at least one first sub-pixel and at least one second sub-pixel. The display device further includes a first electrode, a second electrode and a third electrode. The first electrode is disposed on the first substrate in the first and second sub-pixels (or namely all of the sub-pixels). The second electrode is disposed on the first substrate in the first and second sub-pixels (or namely all of the sub-pixels). The first electrode is spaced apart from the second electrode in the first sub-pixel and the first electrode in the second sub-pixel is spaced apart from the second electrode in the second sub-pixel. The third electrode is disposed on the second substrate in all the sub-pixels. When the display device is operated in a narrow viewing angle mode, there exists a non-zero potential difference between the second and the third electrodes in all of the sub-pixels, and when all of the sub-pixels are at a gray level of zero, the potential difference between the first and the second electrodes is not equal to zero.

In accordance with one embodiment of the present disclosure, one of the first electrode and the second electrode in each of all of the sub-pixels has a plurality of slits.

In accordance with one embodiment of the present disclosure, when the display device is operated in the narrow viewing angle mode, the potential of the first electrode is substantially greater than the potential of the second electrode when all of the sub-pixels are at the gray level of zero.

In accordance with one embodiment of the present disclosure, the potential difference between the first electrode and the second electrode is about 0.04 V to about 1.04 V.

In accordance with one embodiment of the present disclosure, the potential difference between the first electrode and the second electrode is about 0.18 V to about 1.9 V.

In accordance with one embodiment of the present disclosure, when the display device is operated in the narrow viewing angle mode, the potential of the first electrode is substantially less than the potential of the second electrode when all of the sub-pixels are at the gray level of zero.

In accordance with one embodiment of the present disclosure, the potential difference between the first electrode and the second electrode is about −0.04 V to about −1.18 V.

In accordance with one embodiment of the present disclosure, the potential difference between the first electrode and the second electrode is about −0.18 V to about −2.34V.

In accordance with one embodiment of the present disclosure, the potential difference between the second electrode and the third electrode is about 2V to about 10 V.

According to another aspect of the present disclosure, a method for driving an adjustable viewing angle display device is provided. The method includes the steps described below. Firstly, a display device of any embodiments described hereinbefore is provided. Thereafter, a first potential, a second potential, and a third potential are respectively applied to the first electrode, the second electrode, and the third electrode in all of the sub-pixels. When the display device is operated in a narrow viewing angle mode, a non-zero potential difference exists between the second and the third electrodes in all of the sub-pixels, and the potential difference between the first and the second electrodes is not equal to zero when all of the sub-pixels are at a gray level of zero.

BRIEF DESCRIPTION OF THE DRAWINGS

The disclosure can be more fully understood by reading the following detailed description of the embodiments, with reference made to the accompanying drawings as follows:

FIG. 7 is a diagram showing the relationship between $\Delta V_{3\text{-}2}$ and $\Delta V^*_{1\text{-}2}$ in connection with Example 1 and Example 2 of the present disclosure;

FIG. 8 is a diagram showing the relationship between $\Delta V_{3\text{-}2}$ and $\Delta V^*_{1\text{-}2}$ in connection with Example 3 and Example 4 of the present disclosure;

DETAILED DESCRIPTION

Figure 1:
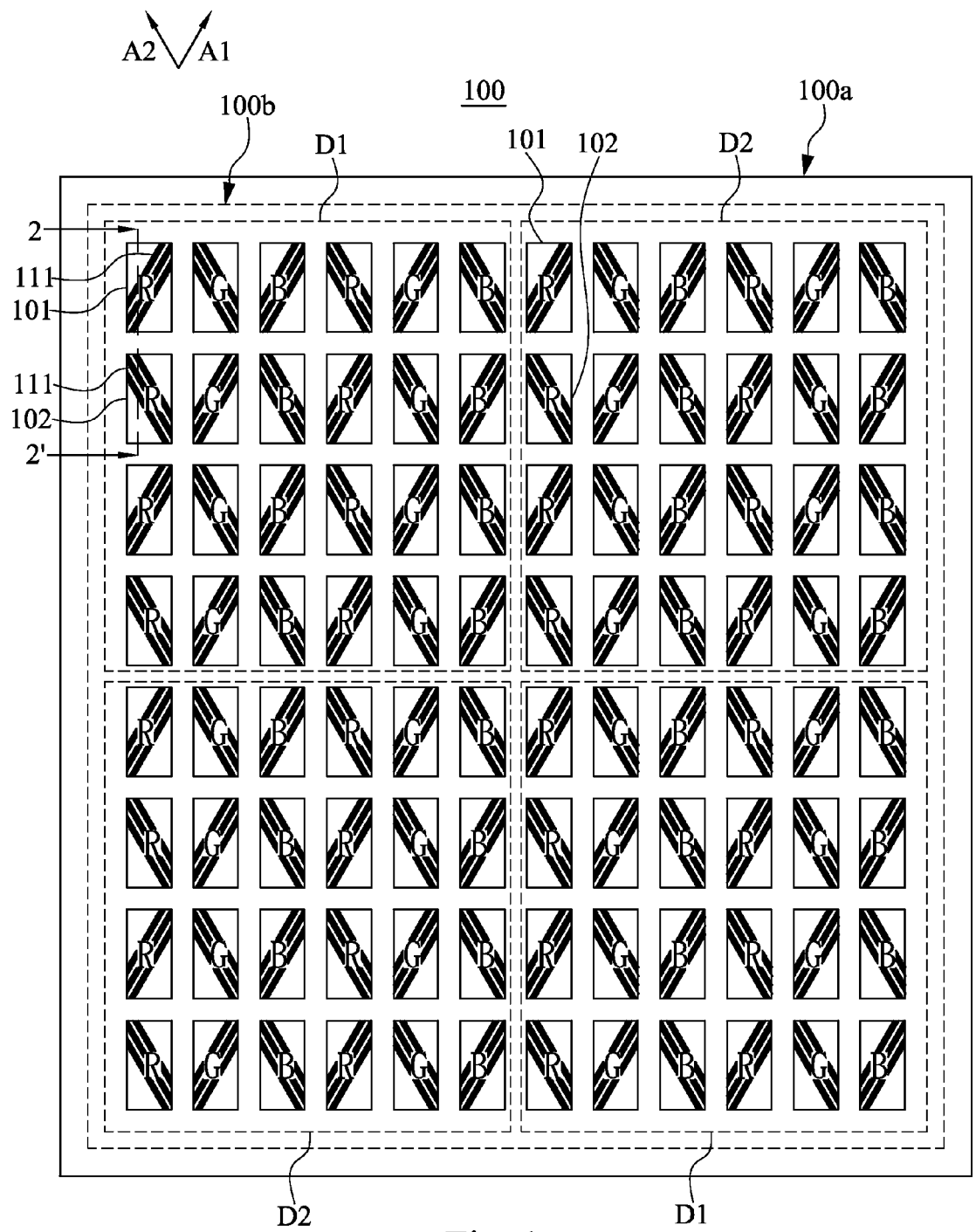
FIG. 1 is a top view schematically illustrating a display device with an adjustable viewing angle according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 1 is a top view schematically illustrating a display device 100 with an adjustable viewing angle according to one embodiment of the present disclosure. The display device 100 with the adjustable viewing angle includes a display panel 100a. On the display panel 100a, a pixel array 100b is defined therein, and the pixel array 100b includes at least one first pixel zone D1 and at least one second pixel zone D2. In one embodiment, the pixel array 100b includes a plurality of first pixel zones D1 and a plurality of second pixel zones D2. In one example, the first pixel zones D1 and the second pixel zones D2 are alternately arranged on the display panel 100a. Each of the first pixel zones D1 includes at least one first sub-pixel 101 and at least one second sub-pixel 102. Similarly, each of the second pixel zones D2 includes at least one first sub-pixel 101 and at least one second sub-pixel 102.

Figure 2A:
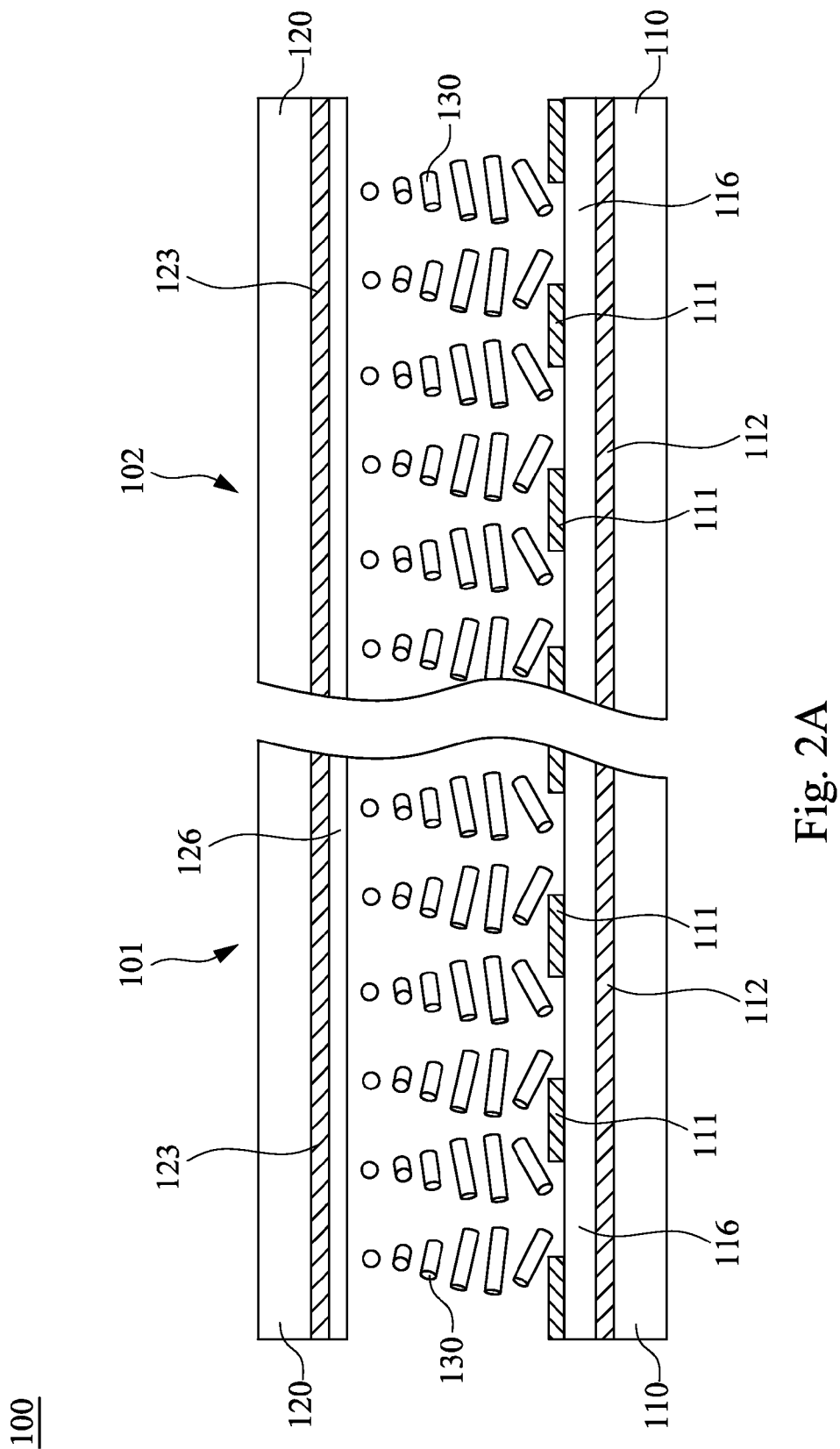
FIG. 2A is a cross-sectional view along line 2-2' in FIG. 1.

FIG. 2A is a cross-sectional view along line 2-2' in FIG. 1. The display panel 100a includes a first substrate 110, a second substrate 120 and a non-self-luminous display medium layer 130. The first substrate 110 and the second substrate 120 are disposed opposite to each other, and the non-self-luminous display medium layer 130 is interposed between the first substrate 110 and the second substrate 120 so as to form the display panel 100a. The non-self-luminous display medium layer 130 may include a liquid crystal layer, an electrophoresis layer, an electro-wetting layer or other suitable materials. The non-self-luminous display medium layer 130 preferably includes a liquid crystal layer according to one embodiment of the present disclosure. Generally, the display panel 100a requires a color filter layer (not shown in FIG. 2) which has multiple colors, and this color filter layer may be disposed on the first substrate 110 or the second substrate 120.

The display device 100 further includes a first electrode 111, a second electrode 112 and a third electrode 123, as shown in FIG. 2A. For example, the first electrode 111 may be disposed on the first substrate 110 and arranged in the first sub-pixel 101 and the second sub-pixel 102 in the first pixel zone D1 and the first electrode 111 may be disposed on the first substrate 110 and arranged in the first sub-pixel 101 and the second sub-pixel 102 in the second pixel zone D2. In other words, the first electrode 111 is disposed in aforesaid (all/these) sub-pixels 101 and aforesaid (all/these) sub-pixels 102 in aforesaid (all/these) pixel zones D1 and aforesaid (all/these) pixel zones D2. The second electrode 112 is disposed on the first substrate 110 and arranged in the first sub-pixel 101 and the second sub-pixel 102 in the first pixel zone D1 and the second electrode 112 is disposed on the first substrate 110 and arranged in the first sub-pixel 101 and the second sub-pixel 102 in the second pixel zone D2. In other words, the second electrode 112 is disposed in aforesaid (all/these) sub-pixels 101 and aforesaid (all/these) sub-pixels 102 in aforesaid (all/these) pixel zones D1 and in aforesaid (all/these) sub-pixels 101 and aforesaid (all/these) sub-pixels 102 in aforesaid (all/these) pixel zones D2. Furthermore, the first electrode 111 and the second electrode 112 in aforesaid (all/these) sub-pixels 101 and 102 in aforesaid (all/these) pixel zones D1 and D2 are spaced apart from each other. In other words, the first electrode 111 in the sub-pixels 101 does not contact the second electrode 112 in the sub-pixels 101 and the first electrode 111 in the sub-pixels 102 does not contact the second electrode 112 in the sub-pixels 102. The third electrode 123 is disposed on the second substrate 120 and arranged in the first sub-pixel 101 and the second sub-pixel 102 in the first pixel zone D1 and the third electrode 123 is disposed on the second substrate 120 and arranged in the first sub-pixel 101 and the second sub-pixel 102 in the second pixel zone D2, such as the third electrode 123 is disposed in aforesaid (all/these) sub-pixels 101 and sub-pixels 102 in aforesaid (all/these) pixel zones D1 and pixel zones D2. Furthermore, the first electrode 111, the second electrode 112 and the third electrode 123 in aforesaid (all/these) sub-pixels 101 and 102 in aforesaid (all/these) pixel zones D1 and D2 are spaced apart from each other. In other words, the third electrode 123 in the sub-pixels 101 does not contact the first electrode 111 and the second electrode 112 in the sub-pixels 101 and the third electrode 123 in the sub-pixels 102 does not contact the first electrode 111 and the second electrode 112 in the sub-pixels 102. Therefore, the third electrode 123 is spaced apart from the first electrode 111 and the second electrode 112 by the non-self-luminous display medium layer 130, and the third electrode 123 does not contact the first electrode 111 and the second electrode 112, which means the non-self-luminous display medium layer 130 is positioned between the third electrode 123 and the first, second electrodes 111, 112.

Figure 2B:
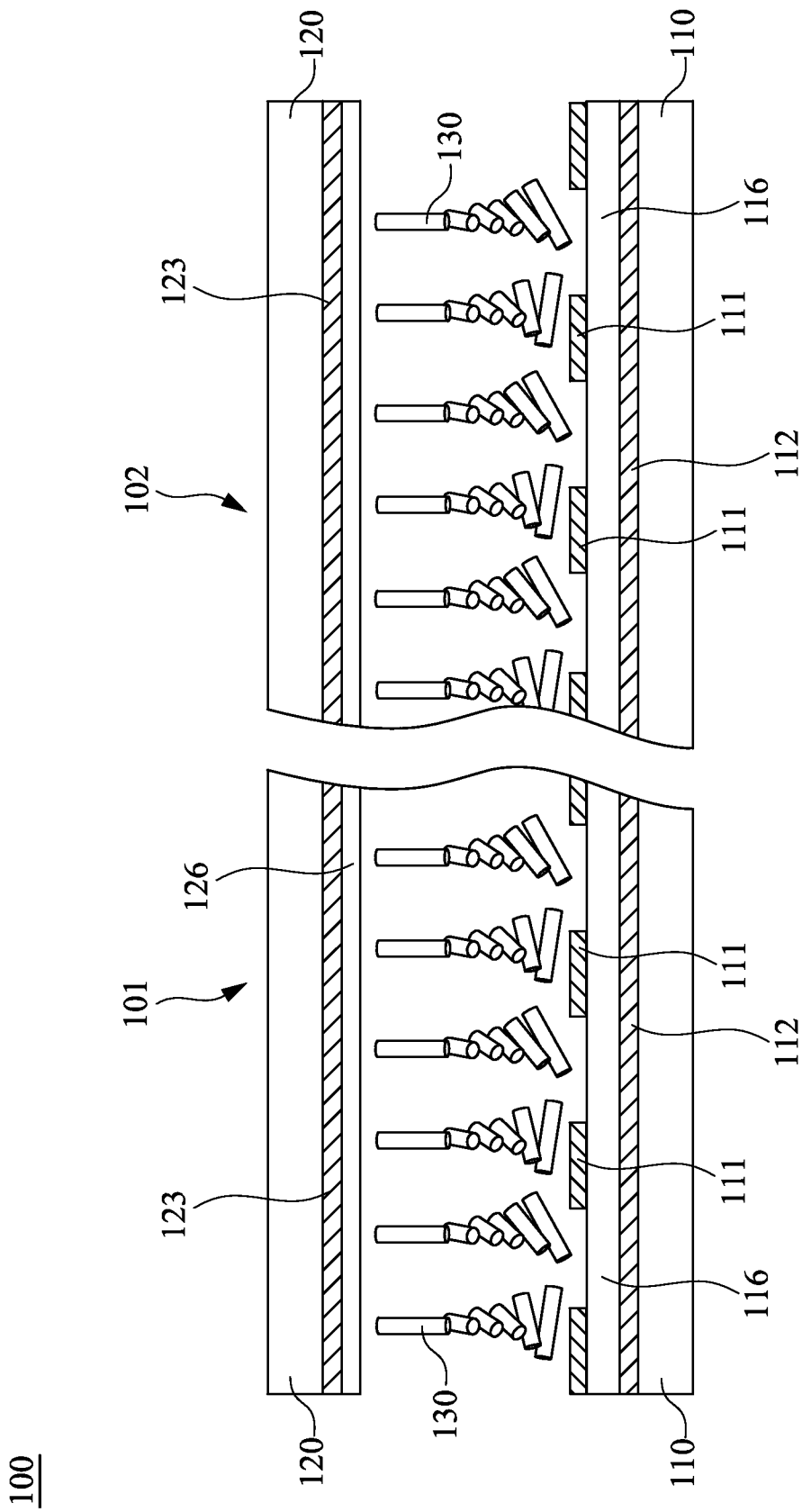
FIG. 2B is a cross-sectional view schematically illustrating the orientation of liquid crystal molecules in the display device with an adjustable viewing angle in the narrow viewing angle mode according to one embodiment of the present disclosure.
Figure 2E:
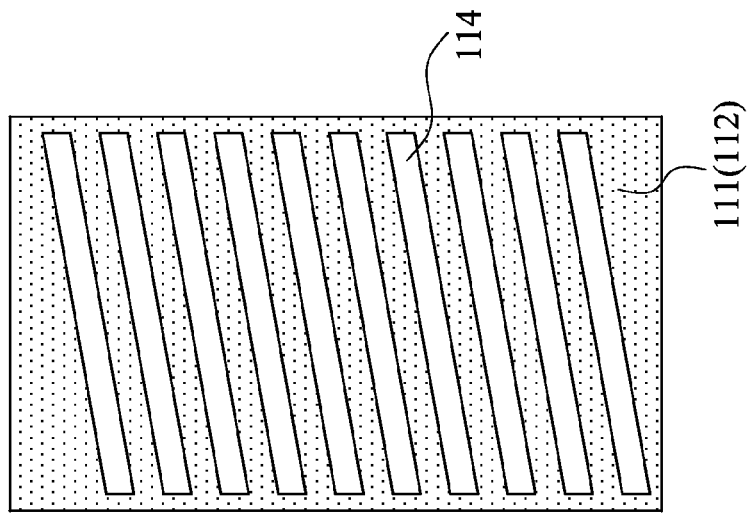
FIGS. 2C to 2H are top views schematically depicting the first electrode and/or the second electrode according to some embodiments of the present disclosure.
Figure 2D:
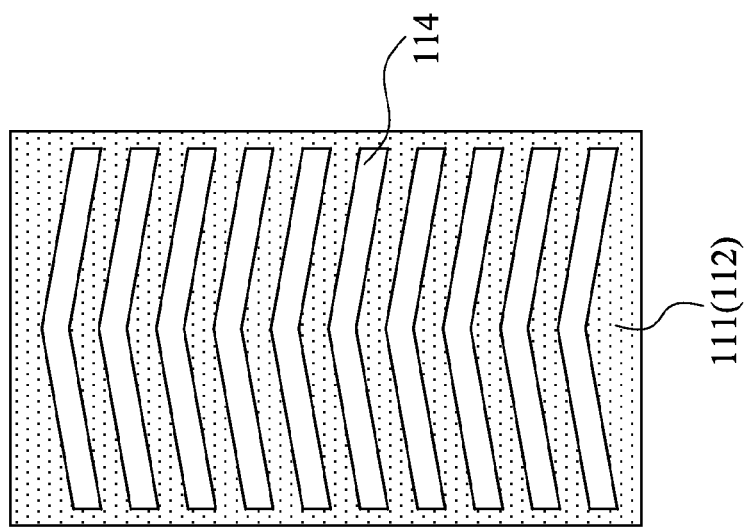
Figure 2C:
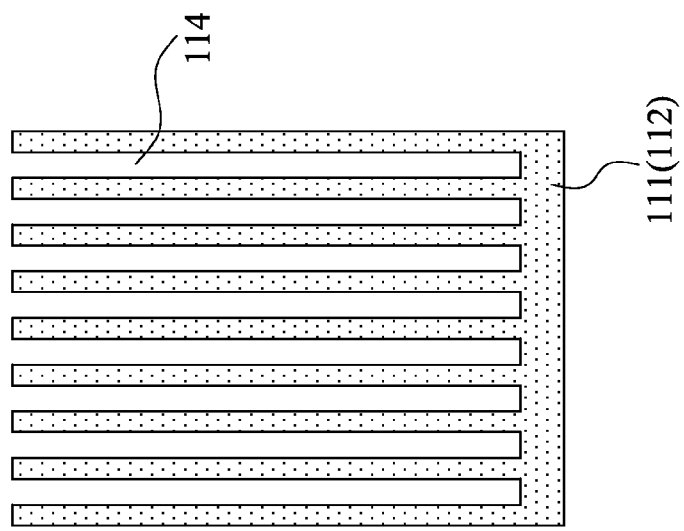
Figure 2H:
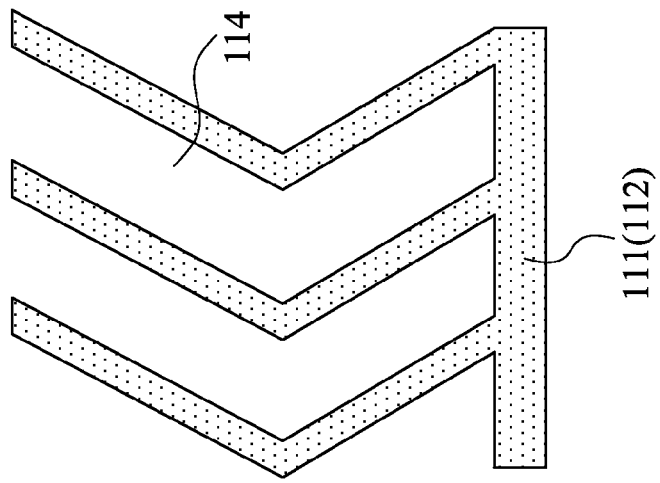
Figure 2G:
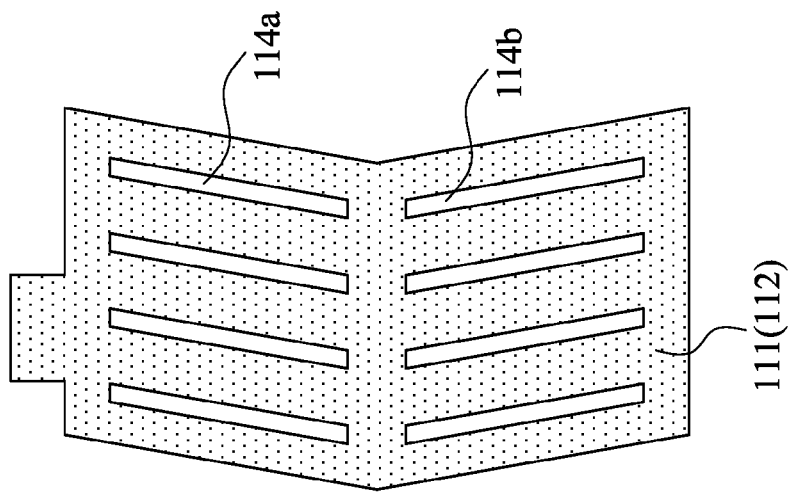
Figure 2F:
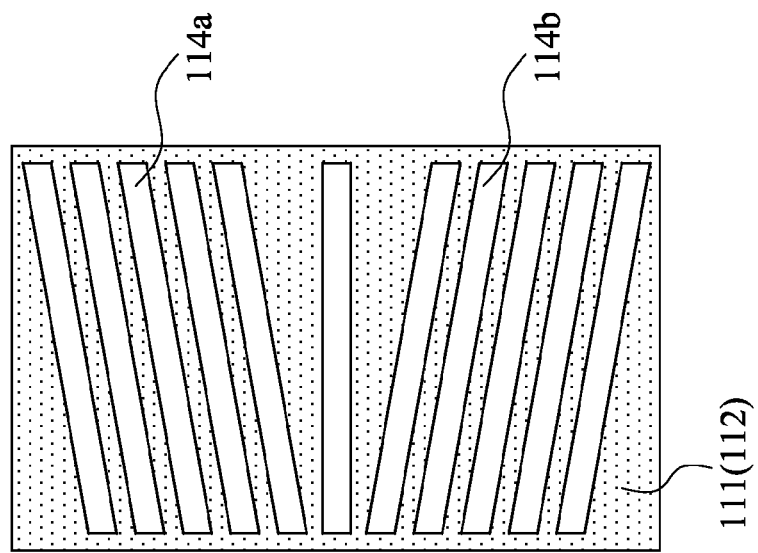

In accordance with some embodiments of the present disclosure, at least one of the first electrode 111 and the second electrode 112 has a plurality of slits. Particularly, the first electrode 111 may have several slits, or alternatively the second electrode 112 may have several slits, or both of the first electrode 111 and the second electrode 112 have several slits. Preferably, each slit in the first electrode 111 and each slit in the second electrode 112 are alternately arranged (or referred to as staggered disposition). In one example, as shown in FIG. 1, the first electrode 111 in the first sub-pixel 101 has several slits (not numbered) extending along a direction A1. The first electrode 111 in the second sub-pixel 102 also has several slit patterns (not numbered), the slits extending along a direction A2. The direction A1 is not parallel to the direction A2, which means the direction A1 intersects with the direction A2. Nevertheless, as shown in FIG. 2A, the slits may be arranged in the first electrode 111 or the second electrode 112. There are a number of specific embodiments for the first electrode 111 and the second electrode 112. FIGS. 2C to 2H are top views schematically depicting the first electrode 111 and/or the second electrode 112 according to some embodiments of the present disclosure. In FIG. 2C, the slits 114 in the first electrode 111 and/or the second electrode 112 extend along a predetermined direction. In FIG. 2D, a number of slits 114 are formed in the first electrode 111 and/or the second electrode 112, and the contour of each slit 114 are similar to a "V" shape or V-like shape. In FIG. 2E, the a number of slits 114 are formed in the first electrode 111 and/or the second electrode 112, and these slits 114 are substantially parallel to each other and extend along a predetermined sloping direction (or namely a predetermined slant direction). In FIG. 2F, the several slits 114a and several slits 114b are formed in the first electrode 111 and/or the second electrode 112. The slits 114a extend along a predetermined sloping direction (or namely a predetermined slant direction), whereas the slits 114b extend along another predetermined sloping direction (or namely another predetermined slant direction). In addition, the two directions of the slits 114a and the slits 114b are different from each other so as to construct a shape similar to a "V" or V-like shape. The slits 114a are located at a first side of an additional slit (not numbered), which extends along a predetermined non-sloping direction, whereas the slits 114b are located at a second side of the additional slit (not numbered), in which the first side is opposite to the second side. In FIG. 2G, the first electrode 111 and/or the second electrode 112 has contours similar to a "V" shape or V-like shape. A number of slits 114a and 114b are formed in the first electrode 111 and/or the second electrode 112, in which the slits 114a and the slits 114b extend toward different directions so as to form a shape similar to a "V" or V-like. In FIG. 2H, the contours of the first electrodes 111 and/or the second electrodes 112 are similar to a "V" shape or V-like shape, and each first electrode 111 and/or each second electrode 112 are connected to a bus electrode (not shown).

The display device 100 is characterized in having an adjustable viewing angle. Particularly, when a potential difference between the second electrode 112 and the third electrode 123 is about zero, the display device 100 is operated in a wide viewing angle mode. When the potential difference between the second electrode 112 and the third electrode 123 is not equal to zero, the display device 100 is operated in a narrow viewing angle mode. In one embodiment, one of the first electrode 111 and the second electrode 112 is a pixel electrode; and other one of the first electrode 111 and the second electrode 112 is an electrode having an adjustable potential such as a common potential, a ground potential or an potential far less than that of the pixel electrode. In accordance with the embodiments described above, there may be several design choices. For instance, the first electrode 111 may be a pixel electrode, and the second electrode 112 may be an electrode with an adjustable potential such as a common potential so that the second electrode 112 may be referred to as a common electrode. Furthermore, the third electrode 123 may be an electrode with a predetermined potential such as a common potential, and thus the third electrode 123 may be referred to as a common electrode. Alternatively, the first electrode 111 may be an electrode with an adjustable potential such as a common potential, so that the first electrode 111 may be to referred to as a common electrode. The second electrode 112 may be a pixel electrode and the third electrode 123 may be an electrode with a predetermined potential such as a common potential, so that the third electrode 123 may be referred to as a common electrode. Otherwise, the first electrode 111 may be a pixel electrode, and the second electrode 112 may be an electrode with an adjustable potential such as a potential far less than that of the pixel electrode, so that the second electrode 112 may be referred to as another pixel electrode; or the first electrode 111 may be an electrode with an adjustable potential such as a potential far less than that of the pixel electrode so that the first electrode 111 may be referred to as another pixel electrode, and thus the second electrode 112 is a pixel electrode. The determination that which one of the first electrode 111 and the second electrode 112 is the pixel electrode depends on which one of the first electrode 111 and the second electrode 112 being connected to the most primary transistor that is used to drive the non-self-luminous display medium layer. Therefore, while one of the first electrode 111 and the second electrode 112 is a pixel electrode, other one of the first electrode 111 and the second electrode 112 is an electrode with an adjustable potential such as a common electrode. Accordingly, one of the first electrode 111 and the second electrode 112 is connected to a transistor whereas the other one the first electrode 111 and the second electrode 112 is not connected to the transistor. If one of the first electrode 111 and the second electrode 112 is used as the pixel electrode, the other one of the first electrode 111 and the second electrode 112 is used as the electrode with the adjustable potential such as a potential far less than the potential of the pixel electrode, so that the other one electrode may be referred to as another pixel electrode. Accordingly, one of the first electrode 111 and the second electrode 112 is connected to the most primary transistor whereas the other one electrode is connected to a non-primary transistor. It can be understood through the embodiments described hereinafter that the first, the second, and the third electrodes of the present disclosure are not limited to the forms described above. When the display device 100 is desired to be operated in the wide viewing angle mode, the second electrode 112 and the third electrode 123 may be applied with substantially the same voltage, for example, about 5 V or 0 V, so that the potential difference between the second electrode 112 and the third electrode 123 is about zero, and therefore the display device 100 may be operated in the wide viewing angle mode. To the contrary, when the display device 100 is desired to be operated in the narrow viewing angle mode, the second electrode 112 and the third electrode 123 are applied with different potentials. For example, the third electrode 123 may be applied with a potential of about 5 V (voltage), and the second electrode 112 may be applied with a potential of about 0 V or 10 V. Accordingly, an electric field is formed due to the potential difference between the second electrode 112 and the third electrode 123, and thereby the display device 100 is operated in the narrow viewing angle mode. In one embodiment that the display medium layer 130 includes liquid crystal molecules (the display medium layer 130 of the present disclosure is not limited to the liquid crystal molecules), the orientation of liquid crystal molecules is schematically shown in FIG. 2A when the display device 100 is operated in the wide viewing angle mode. In addition, when the display device 100 is operated in the narrow viewing angle mode, the orientation of liquid crystal molecules therein is schematically shown in FIG. 2B. Therefore, the orientation and the twist state of the liquid crystal molecules 130 from the first substrate 110 to the second substrate 120 in the wide viewing angle mode shown in FIG. 2A are totally different from that in the narrow viewing angle mode shown in FIG. 2B.

In accordance with embodiments of the present disclosure, when the display device 100 is operated in the narrow viewing angle mode, the potential difference between the second electrode 112 and the third electrode 123 within the sub-pixel is not equal to zero; and under the narrow viewing angle mode, the potential difference between the first electrode 111 and the second electrode 112 is not equal to zero while the sub-pixel is at a gray level of zero (L0). In other words, under the narrow viewing angle mode, when the sub-pixel is at the gray level of zero (L0), a non-zero potential difference exists between the first electrode 111 and the second electrode 112. The gray level of zero represents that the display panel exhibits a black screen (black image). When the display device 100 is operated in the wide viewing angle mode, the potential difference between the second electrode 112 and the third electrode 123 is about zero; and under the wide viewing angle mode, the potential difference between the first electrode 111 and the second electrode 112 is about zero while the sub-pixel is at the gray level of zero (L0). In other words, when the display device 100 is operated in the wide viewing angle mode, the potentials of the first electrode 111, the second electrode 112, and the third electrode 123 are substantially the same while the sub-pixel is at the gray level of zero (L0). For example, each of the first electrode 111, the second electrode 112 and the third electrode 123 is applied with a potential of about 0 V (voltage), 3 V, or 5 V. More details are described in the embodiments and examples hereinafter.

First Embodiment

The top view and cross-sectional view of a display device 100 according to a first embodiment are respectively as shown in FIGS. 1 and 2A. In this embodiment, the first electrode 111 and the second electrode 112 are disposed on the first substrate 110. One of the first electrode 111 and the second electrode 112 has a number of slits. Furthermore, as described hereinbefore, one of the first electrode 111 and the second electrode 112 is a pixel electrode, and the other one of the first electrode 111 and the second electrode 112 is an electrode with an adjustable potential such as a common potential, a ground potential, or a potential far less than that of the pixel electrode. For example, the first electrode 111 is a comb electrode which acts as the pixel electrode of each sub-pixel. The second electrode 112 is a common electrode, which is a blanket electrode (or namely the electrode is not exist any slits) covering the entire sub-pixel. In other embodiments, the first electrode 111 and the second electrode are both comb electrodes, and the first electrode 111 and the second electrode are alternately arranged (or referred to as staggered disposition). The first electrode 111 and the second electrode 112 are spaced at an vertical interval, which means the two electrodes are disposed on different level surfaces and thus the first electrode 111 does not physically contact the second electrode 112. A dielectric layer 116 is interposed between the first electrode 111 and the second electrode 112. That is, one of the first electrode 111 and the second electrode 112 is disposed on the upper surface of the dielectric layer 116, and the other one of the first electrode 111 and the second electrode 112 is disposed on the bottom surface of the dielectric layer. The third electrode 123 is arranged on the second substrate 120, and the third electrode 123 may be referred to as a common electrode or a counter electrode. Optionally, a planarization layer 126 may be disposed on the third electrode 123, and the planarization layer 126 covers the third electrode 123. The planarization layer 126 that covers the third electrode 123 is taken as an example in this embodiment. The first electrode 111 is disposed between the second electrode 112 and the third electrode 123. Furthermore, the third electrode 123 in this embodiment is a blanket electrode layer (or namely electrode is not exist any slit) that covers the area occupied by all of the sub-pixels 101 and 102. In other embodiments, the third electrode 123 can be divided into a first part (not shown) and a second part (not shown) respectively positioned in the first sub-pixel 101 and the second sub-pixel 102 on the second substrate 120, in which the first part and the second part are separated and are not physically in contact with each other.

In this embodiment, when the display device 100 is operated in the narrow viewing angle mode, the potential of the first electrode 111 is substantially larger than the potential of the second electrode 112 while the sub-pixel is at the gray level of zero (L0). According to some examples of the present disclosure, the potential difference between the first electrode 111 and the second electrode 112 is about 0.04 V to about 1.04 V. The technical effects of this voltage range will be described in details hereinafter.

Figure 3A:
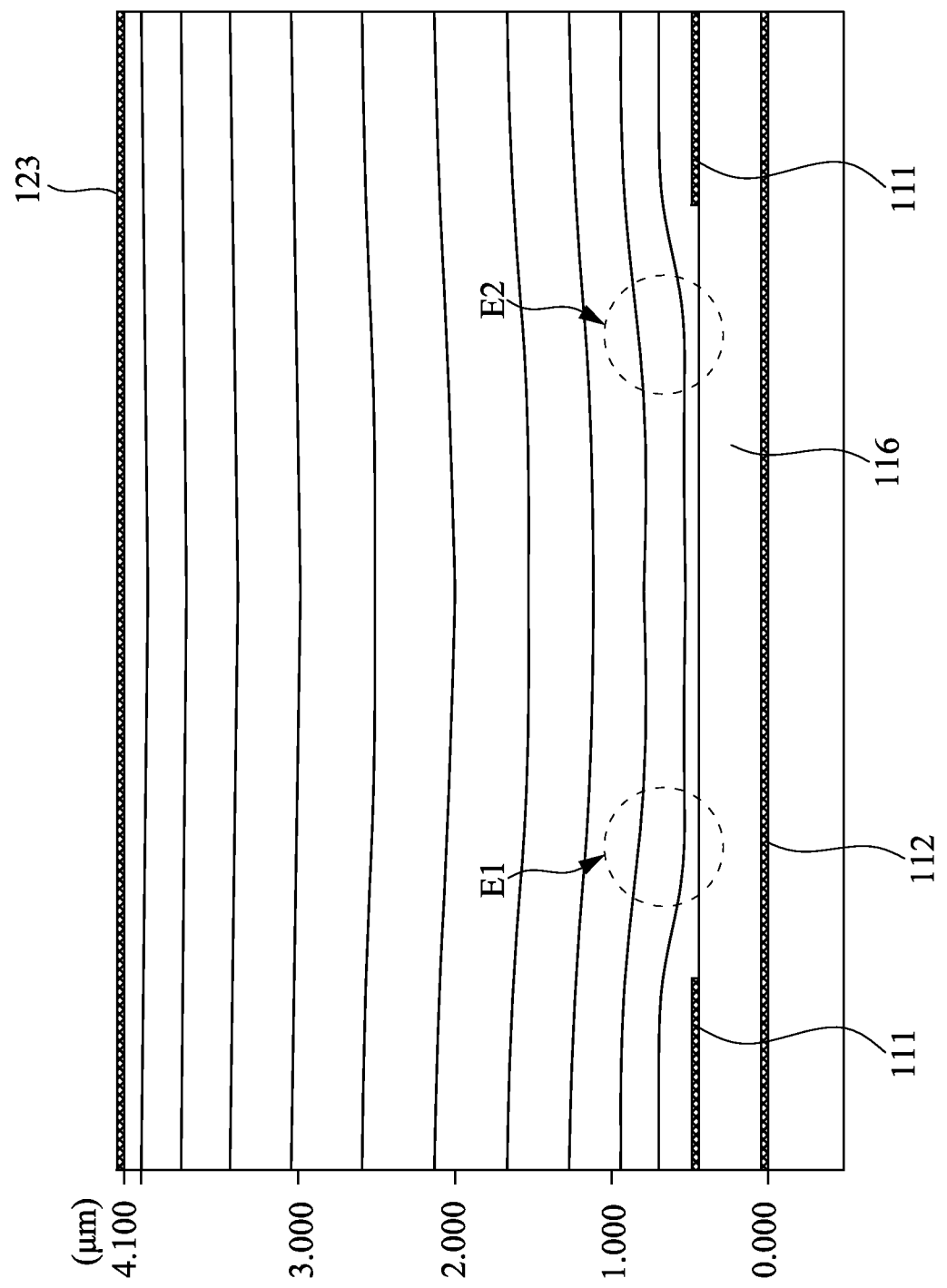
FIG. 3A depicts a equipotential diagram at a position near the edge of the first electrode in the narrow viewing angle mode when the potential difference between the first electrode and the second electrode is zero according to one experimental example of the present disclosure.
Figure 3B:
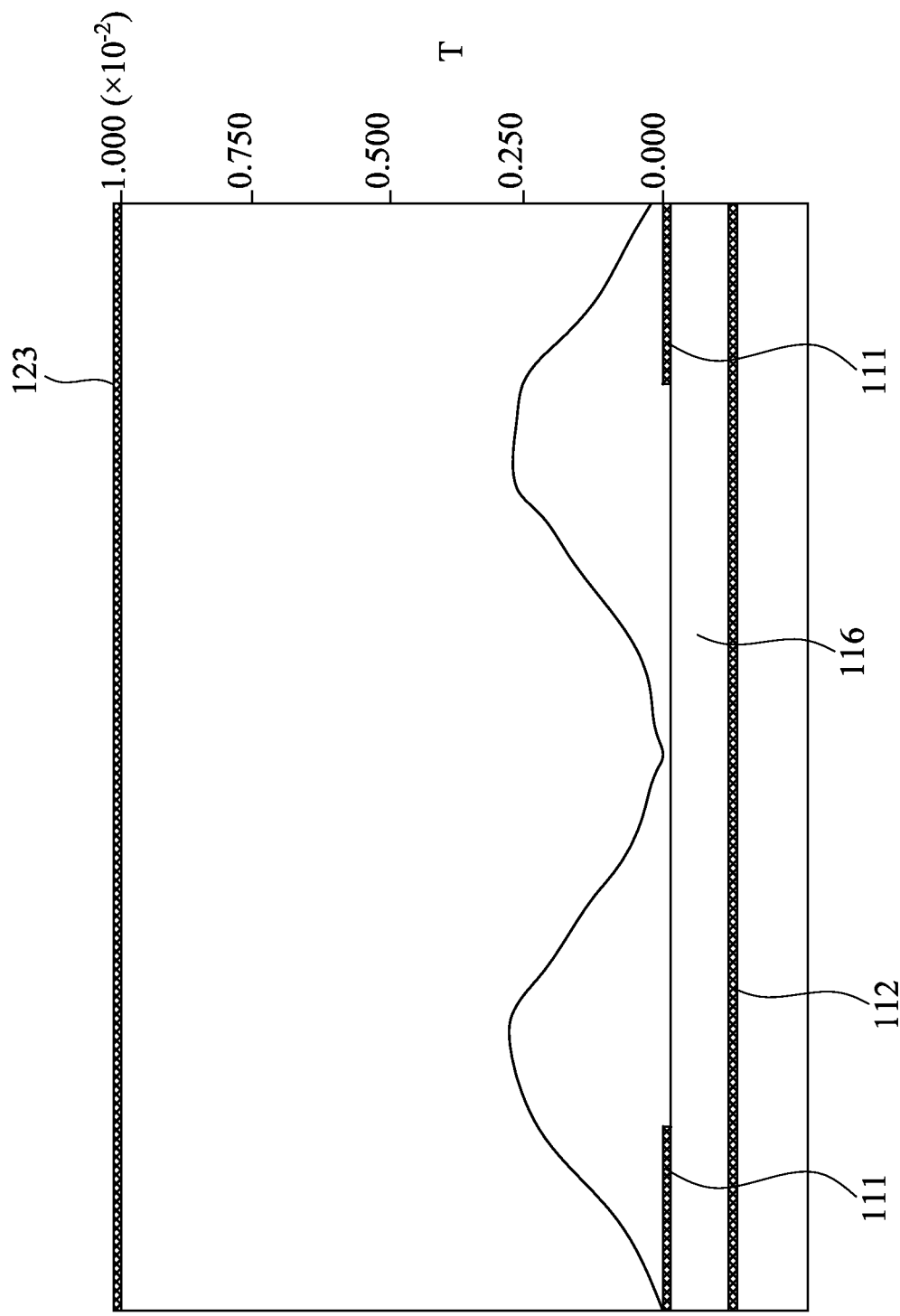
FIG. 3B depicts a transmittance diagram of the liquid crystal layer in the vicinity of the edge of the first electrode according to one experimental example of the present disclosure.

In general, when the sub-pixel of the display device 100 displays information at a gray level of zero (i.e., the lowest gray level of the displaying data), the potential difference between the pixel electrode and the common electrode in the sub-pixel is about 0 V. Nevertheless, in the first embodiment, to when the display device 100 is operated in the narrow viewing angle mode, the sub-pixel at the gray level of zero suffers light leakage at an edge of each first electrode 111 while the potential difference between the first electrode 111 and the second electrode 112 is about zero, and therefore the contrast of the display device 100 is significantly decreased at the gray level of zero. Specifically, when the contrast ratio of the display device 100 in the wide viewing angle mode is about 4100, the contrast ratio of the display device 100 in the narrow viewing angle mode is decreased to about 1320, in which the contrast ratio (unit: none) refers to the ratio of the on-axis brightness at the maximal gray level (i.e., bright state) to the on-axis brightness at the minimal gray level (i.e., dark state). FIG. 3A depicts the equipotential diagram at a position near the edge of the first electrode 111 in the narrow viewing angle mode when the potential difference between the first electrode 111 and the second electrode 112 is zero, according to one experimental example of the present disclosure. In this experimental example, the potential of the third electrode 123 is about 5 V, and the potentials of the first electrode 111 and the second electrode 112 are about 0 V. Since the potential difference between the third electrode 123 and the second electrode 112 is not zero (about 5 V), the display device 100 is operated in the narrow viewing angle mode. It can be observed in FIG. 3A that although both the potentials of the first electrode 111 and the second electrode 112 are about 0 V, the equipotential line is bumpy (or namely rugged and rough) in the vicinity of the edge of the first electrode 111 (at positions E1 and E2 shown in FIG. 3A). That is, the electric field in the vicinity of the edge of the first electrode 111 is not perpendicular to the first substrate, which results in that the orientation of liquid crystal molecules at this position (E1 and/or E2) differs from that at other positions. The ordinate in FIG. 3A refers to the distance (unit: micron (μm)) counted from the bottom layer electrode (for example, the second electrode 112) up to the third electrode 123. More particularly, the liquid crystal molecules at the position near the edge of the first electrode 111 have a rotational deflection, and that leads to light leakage at the edge of the first electrode 111 when the sub-pixel is at the gray level of zero. Accordingly, the contrast ratio of the display device 100 is decreased. FIG. 3B depicts the transmittance diagram of the liquid crystal layer in the vicinity of the edge of the first electrode 111 according to this experimental example. The ordinate in FIG. 3B is the normalized transmittance (i.e., the maximal normalized transmittance is defined as 1, unit: none). In FIG. 3B, a normalized transmittance of about $0.26 \times 10^{-2}$ occurs at the edge of the first electrode 111, and that leads to the light leakage as the sub-pixel is in the dark state.

Figure 4:
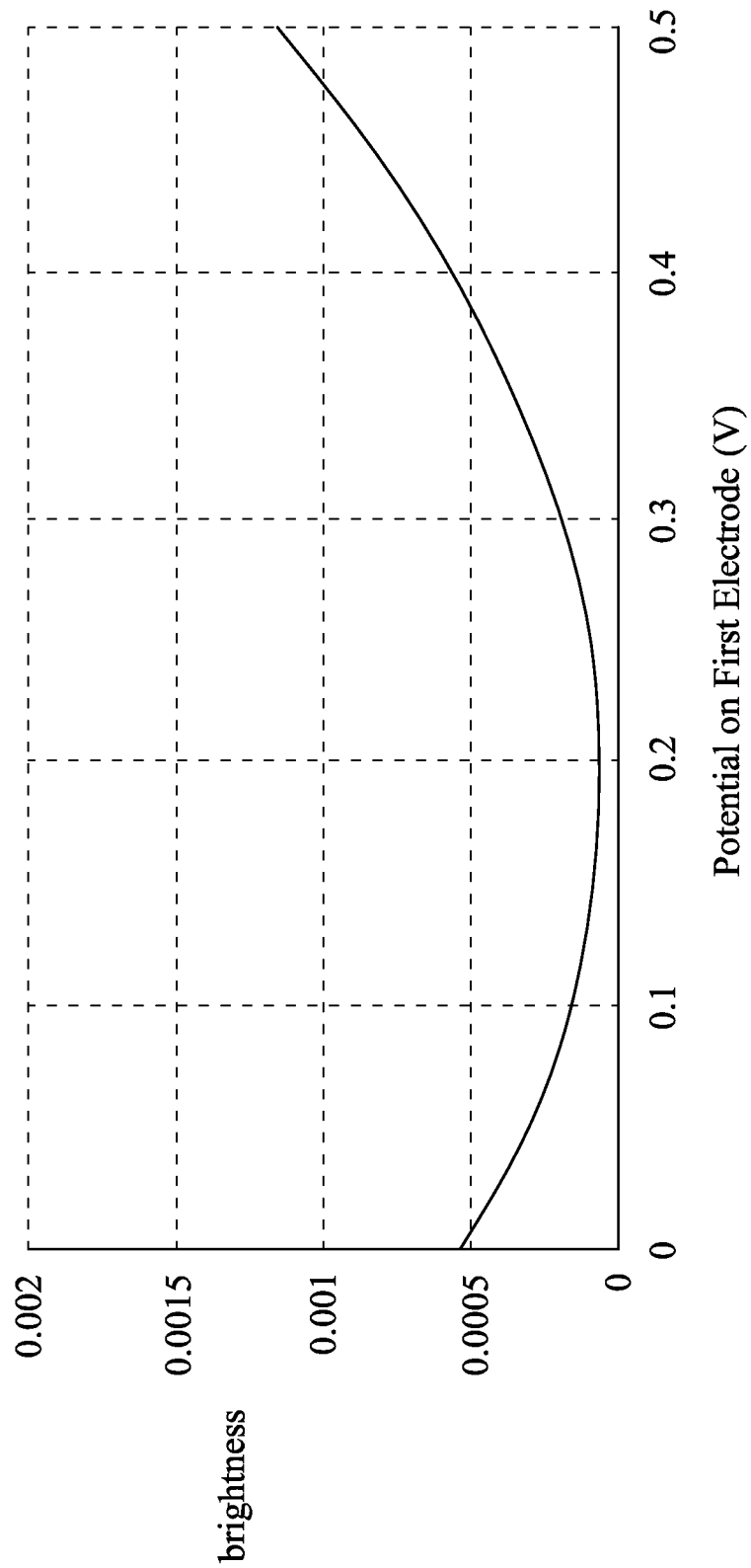
FIG. 4 depicts a diagram illustrating the relationship between the potential and the on-axis brightness in the narrow viewing angle mode in one experimental example of the present disclosure.

FIG. 4 depicts a diagram illustrating the relationship between the potential and the on-axis brightness in the narrow viewing angle mode in the experimental example described above. The ordinate in FIG. 4 is the normalized on-axis brightness (unit: none), and the abscissa is the potential of the first electrode 111 (the potential of the second electrode 112 is about zero). It can be found unexpectedly in FIG. 4 that when the potential of the first electrode 111 is about 0.2 V, the display device 100 has the minimal brightness. In other words, if the potential of the first electrode 111 in the sub-pixel is modulated to about 0.2 V at the gray level of zero, then the on-axis light leakage at the gray level of zero can be improved.

Figure 5A:
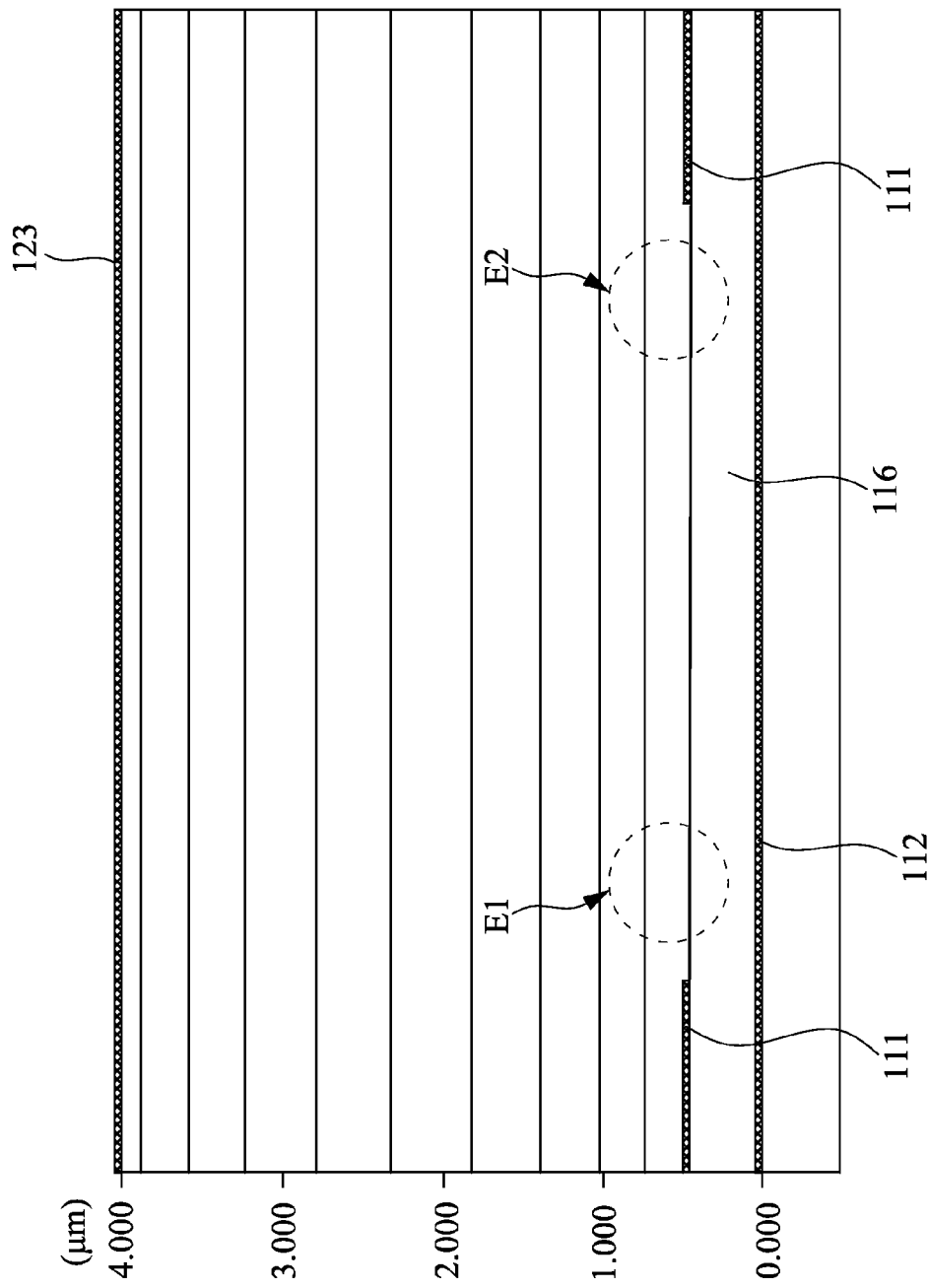
FIG. 5A depicts an equipotential diagram at a position near the edge of the first electrode in the narrow viewing angle mode according to one example of the present disclosure.
Figure 5B:
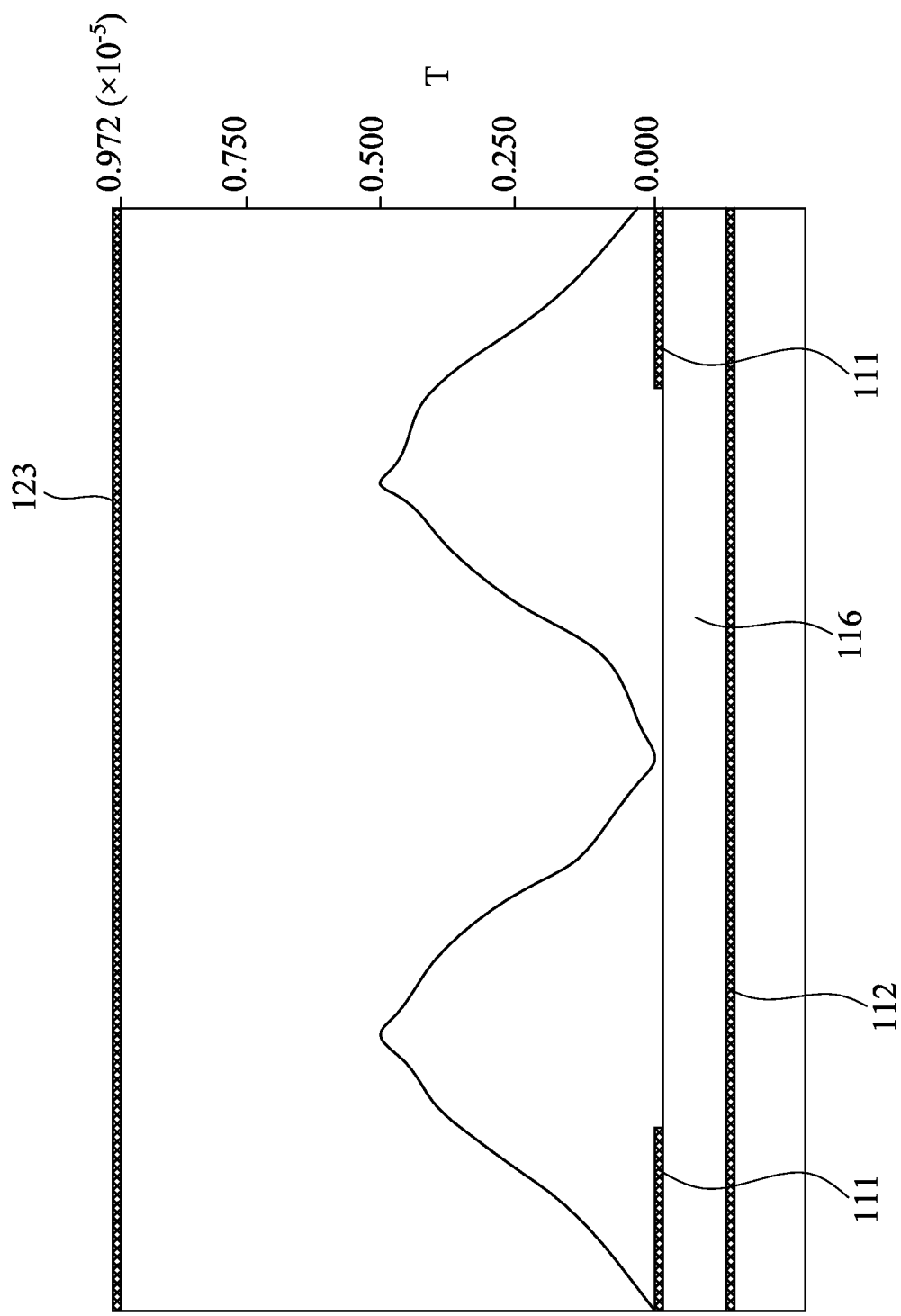
FIG. 5B depicts a transmittance diagram of the liquid crystal layer according to one example of the present disclosure.

FIG. 5A depicts an equipotential diagram at a position near the edge of the first electrode 111 in the narrow viewing angle mode according to one example of the present disclosure. The ordinate in FIG. 5A refers to the distance (unit: micron (μm)) counted from the bottom layer electrode (for example, the second electrode 112) up to the third electrode 123. In this embodiment, the potential of the first electrode 111 is about 0.2 V, the potential of the second electrode 112 is about 0 V, and the potential of the third electrode 123 is about 5 V. It can be seen in FIG. 5A that although an potential difference of about 0.2 V exists between the first electrode 111 and the second electrode 112, the equipotential line at the edge of the first electrode 111 is substantially flat (or namely substantially planar, at the positions E1 and E2 shown in FIG. 5A). That is, the electric field in the vicinity of the edge of the first electrode 111 is substantially perpendicular to the first substrate. Therefore, the rotational deflection of the liquid crystal molecules at the position near the edge of the first electrode 111 may significantly be reduced. FIG. 5B depicts the transmittance diagram of the liquid crystal layer according to this example. The ordinate in FIG. 5B is the normalized transmittance (i.e., the maximal normalized transmittance is defined as 1, unit: none). It can be seen in FIG. 5B that the normalized transmittance of the liquid crystal layer at the edge of the first electrode 111 is only $0.5 \times 10^{-5}$. In other words, in this example, the light leakage of the sub-pixel in the dark state is significantly reduced.

Figure 6A:
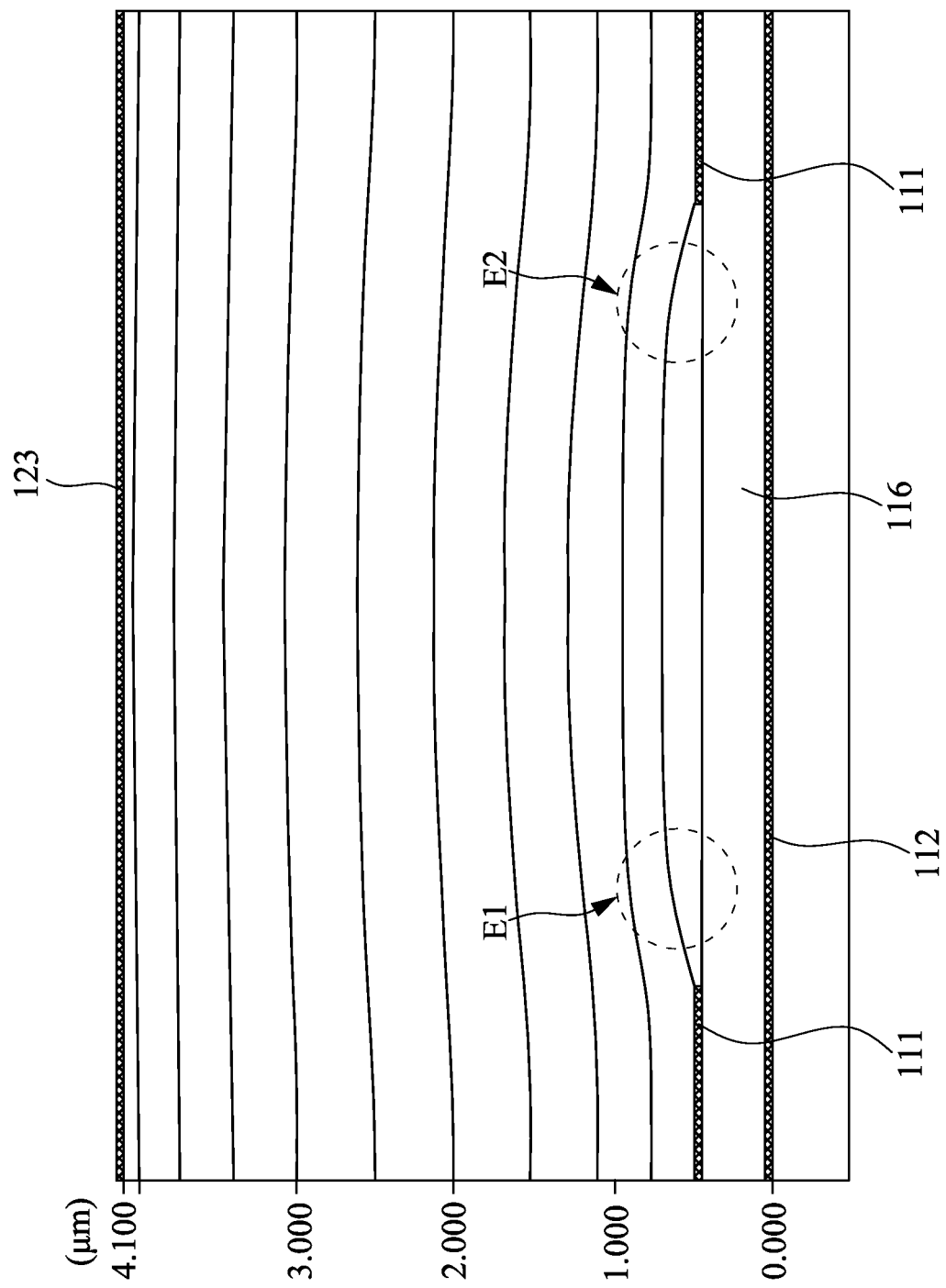
FIG. 6A depicts an equipotential diagram at a position the near the edge of the first electrode in the narrow viewing angle mode according to one example of the present disclosure.

FIG. 6A depicts an equipotential diagram at a position the near the edge of the first electrode in the narrow viewing angle mode according to one example of the present disclosure. In this example, the potential of the first electrode 111 is about 0.4 V, the potential of the second electrode 112 is about 0 V, and the potential of the third electrode 123 is about 5 V. It can be seen in FIG. 6A that the equipotential line at the position near the edge of the first electrode 111 is bumpy (or namely rugged and rough, as the positions E1 and E2 shown in FIG.

Figure 6B:
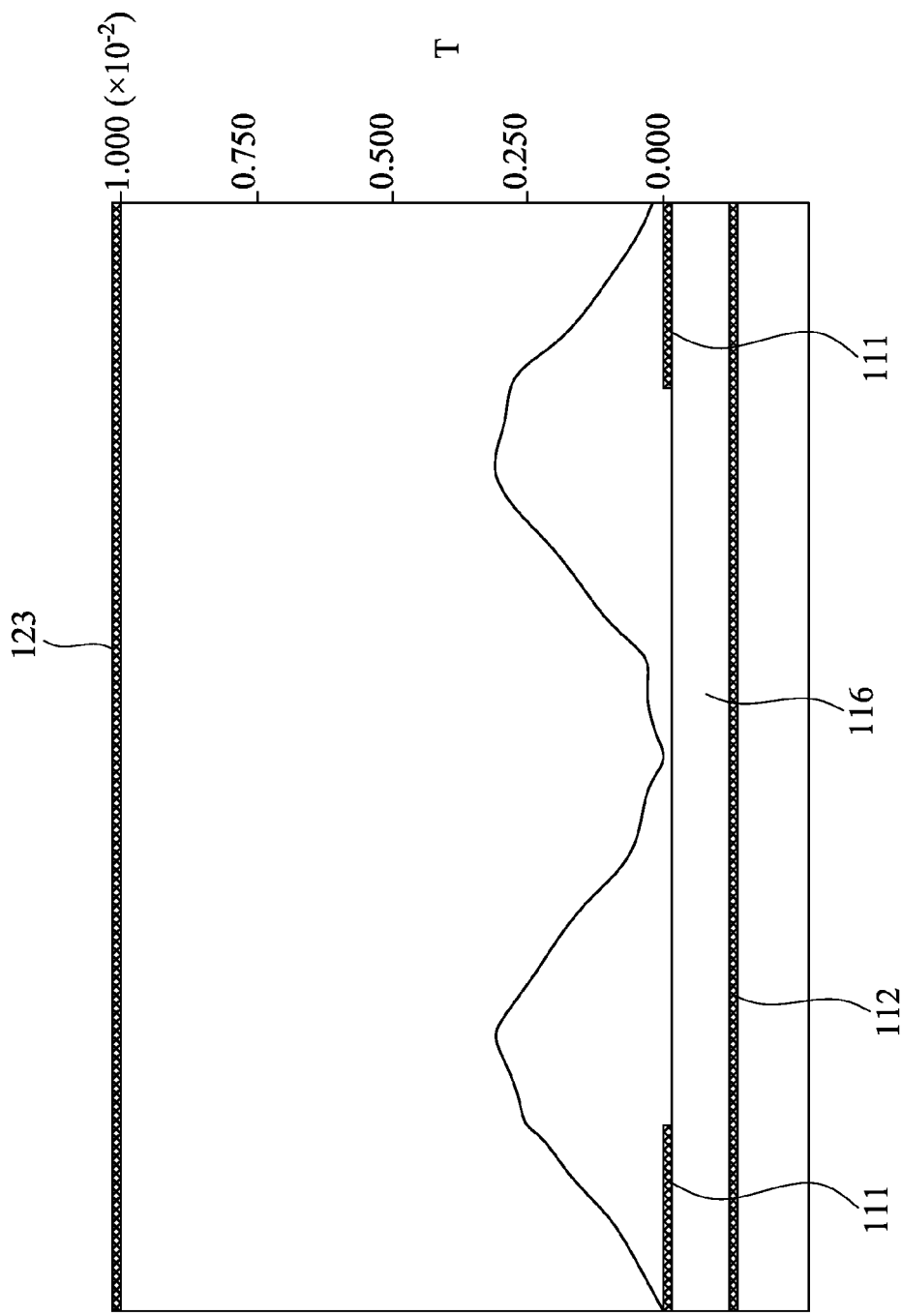
FIG. 6B depicts a transmittance diagram of the liquid crystal layer according to one example of the present disclosure.

6A) when there exists a potential difference of about 0.4 V between the first electrode 111 and the second electrode 112. That is, if the potential of the first electrode 111 in the sub-pixel is about 0.4 V at the gray level of zero, the light leakage still occurs when the sub-pixel is at the gray level of zero. FIG. 6B depicts the transmittance diagram of the liquid crystal layer according to this example. The ordinate in FIG. 6B is the normalized transmittance (i.e., the maximal normalized transmittance is defined as 1, unit: none). It can be seen in FIG. 6B that the normalized transmittance of the liquid crystal layer at the edge of the first electrode 111 is about $0.26 \times 10^{-2}$. The phenomenon observed from FIG. 3A, FIG. 3B, FIG. 5A, FIG. 5B, FIG. 6A, and FIG. 6B is consistent with the result of FIG. 4. That is, in this embodiment, the exists a non-zero optimal value of the potential difference between the first electrode 111 and the second electrode 112 which enables the sub-pixel of the display device 100 at the gray level of zero has a minimal on-axis brightness (i.e., the on-axis brightness in the dark state is minimal). The aforesaid optimal value of the potential difference between the first electrode 111 and the second electrode 112 is referred to as "the optimal potential difference" hereinafter. In this embodiment, it is taken as an example that the first electrode 111 acts as the pixel electrode and the second electrode 112 acts as the common electrode.

It is observed that when the display device is operated in the narrow viewing angle mode, the potential difference ($\Delta V_{3-2}$) between the third electrode 123 and the second electrode 112 influences "the optimal potential difference", and $\Delta V_{3-2}$ is obtained as the potential of the third electrode 123 minus the potential of the second electrode 112 (unit: volt (V)). The structural parameter of the sub-pixel in a panel 100a will also influence "the optimal potential difference". According to the first embodiment, the potential difference between the second electrode 112 and the third electrode 123 is about 2 V to about 10 V, in the narrow viewing angle mode.

The following Table 1 summaries the optimal potential differences ($\Delta V^*_{1-2}$) according to two examples of the first embodiment. $\Delta V^*_{1-2}$ refers to the potential of the first electrode 111 minus the potential of the second electrode 112 (unit: volt (V)). In Example 1, the display medium layer 130 is a liquid crystal layer with a thickness of about 3-micron (μm); the planarization layer 126 has a thickness of about 2 microns (μm) and the dielectric coefficient thereof is about 4.5 (unit: none); and the protective layer (not depicted) on the first substrate 110 has a thickness of about 0.6 microns (μm) and the dielectric coefficient thereof is about 6.65 (unit: none). In Example 2, the display medium layer 130 is a liquid crystal layer with a thickness of about 4 microns (μm); the planarization layer 126 has a thickness of about 5 μm and the dielectric coefficient thereof is about 2.5; the protective layer (not shown) on the first substrate 110 has a thickness of about 0.2 μm and the dielectric coefficient thereof is about 6.65. Furthermore, the thickness of alignment layer (polyimide, PI) is about 0.04 μm to about 0.1 μm in Example 1 and Example 2, and the dielectric coefficient thereof is about 6. The alignment layer covers the first electrode 111 and the second electrode 112 of the first substrate, as well as the third electrode 123 of the second substrate.

TABLE 1

| $\Delta V_{3-2}$ (V) | Example 1 $\Delta V^*_{1-2}$ (V) | Example 2 $\Delta V^*_{1-2}$ (V) |
|---|---|---|
| 3 | 0.04 | 0.23 |
| 4 | 0.05 | 0.34 |
| 5 | 0.06 | 0.46 |
| 6 | 0.08 | 0.58 |
| 7 | 0.10 | 0.70 |
| 8 | 0.10 | 0.82 |
| 9 | 0.12 | 0.92 |
| 10 | 0.14 | 1.04 |

In Example 1, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about 0.04 V. When the $\Delta V_{3-2}$ is about 10 V, the optimal potential difference ($\Delta V^*_{1-2}$) between the first electrode 111 and the second electrode 112 is about 0.14 V.

In Example 2, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about 0.23 V. When $\Delta V_{3-2}$ is about 10 V, the optimal potential difference ($\Delta V^*_{1-2}$) between the first electrode 111 and the second 112 is about 1.04 V.

FIG. 7 is a diagram showing the relationship between $\Delta V_{3-2}$ and $\Delta V^*_{1-2}$ in connection with Example 1 and Example 2. In FIG. 7, curve A represents the result of Example 1, and curve B represents the result of Example 2. It may be found apparently that the optimal potential difference ($\Delta V^*_{1-2}$) increases when the potential difference ($\Delta V_{3-2}$) between the third electrode 123 and the second electrode 112 increases. Particularly, a substantially linear relation is observed between $\Delta V_{3-2}$ and $\Delta V^*_{1-2}$. The sub-pixel structures in Example 1 and Example 2 are designed in accordance with two typical structure designs. The optimal potential difference ($\Delta V^*_{1-2}$) of the sub-pixel is ranged between curve A and curve B when the liquid crystal layer is about 3 μm to about 4 μm in thickness, the planarization layer 126 is about 2 μm to about 5 μm in thickness and the dielectric coefficient thereof is about 2.5 to about 4.5, the protective layer (not shown) on the first substrate 110 is about 0.2 μm to about 0.6 μm in thickness, and the alignment layer (PI) is about 0.04 μm to about 0.1 μm in thickness. In other words, in this embodiment, when $\Delta V_{3-2}$ is about 3 V, the optimal potential difference ($\Delta V^*_{1-2}$) is about 0.04 V to about 0.23 V. When $\Delta V_{3-2}$ is about 4 V, the optimal potential difference ($\Delta V^*_{1-2}$) is about 0.05 V to about 0.34 V. When $\Delta V_{3-2}$ is about 5 V, the optimal potential difference ($\Delta V^*_{1-2}$) is about 0.06 V to about 0.46 V. When $\Delta V_{3-2}$ is about 6 V, the optimal potential difference ($\Delta V^*_{1-2}$) is about 0.08 V to about 0.58 V. When $\Delta V_{3-2}$ is about 7 V, the optimal potential difference ($\Delta V^*_{1-2}$) is about 0.1 V to about 0.7 V. When $\Delta V_{3-2}$ is about 8 V, the optimal potential difference ($\Delta V^*_{1-2}$) is about 0.1 V to about 0.82 V. When $\Delta V_{3-2}$ is about 9 V, the optimal potential difference ($\Delta V^*_{1-2}$) is about 0.12 V to about 0.92 V. When $\Delta V_{3-2}$ is about 10 V, the optimal potential difference ($\Delta V^*_{1-2}$) is about 0.14 V to about 1.04 V.

Now referring back to FIG. 4, when the potential of the first electrode 111 is substantially larger than 0.2 V, the brightness of the display device 100 increases as the potential of the first electrode 111 is increased. Therefore, the sub-pixel may have a predetermined brightness by providing a potential substantially larger than about 0.2 V to the first electrode 111. Particularly, when the non-self-luminous display medium layer 130 is a liquid crystal material with an operating voltage of about 5 V, the optimal potential difference between the first electrode 111 and the second electrode 112 is about 0.2 V at the gray level of zero (L0) while the display device 100 is operated in the narrow viewing angle mode, and the potential difference between the first electrode 111 and the second electrode 112 is about 5 V at the gray level of 255 (L255).

Second Embodiment

The display device in the second embodiment has a structure similar to the structure in the first embodiment, except that there is no planarization layer 126 (with reference to FIG. 2A) on the second substrate 120 in the second embodiment. The first electrode 111 acts as the pixel electrode while the second electrode 112 acts as the common electrode. In this embodiment, the potential difference between the first electrode 111 and the second electrode 112 is about 0.18 V to about 1.9 V.

The following Table 2 shows the optimal potential differences ($\Delta V^*_{1-2}$) of two examples according to this embodiment. The sub-pixel structures of Example 3 and Example 4 are respectively the same as that of Example 1 and Example 2, except that the sub-pixel structures of Example 3 and Example 4 do not include the planarization layer 126. $\Delta V_{3-2}$ refers to the potential of the third electrode 123 minus the potential of the second electrode 112 (unit: volt (V)); and $\Delta V^*_{1-2}$ refers to the potential of the first electrode 111 minus the potential of the second electrode 112 (unit: volt (V)).

TABLE 2

| $\Delta V_{3-2}$ (V) | Example 3 $\Delta V^*_{1-2}$ (V) | Example 4 $\Delta V^*_{1-2}$ (V) |
|---|---|---|
| 3 | 0.18 | 0.46 |
| 4 | 0.26 | 0.71 |
| 5 | 0.34 | 0.94 |
| 6 | 0.42 | 1.15 |
| 7 | 0.49 | 1.35 |
| 8 | 0.56 | 1.54 |
| 9 | 0.62 | 1.73 |
| 10 | 0.69 | 1.90 |

In Example 3, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about 0.18 V. When $\Delta V_{3-2}$ is about 10 V, the optimal potential ($\Delta V^*_{1-2}$) between the first electrode 111 and the second electrode 112 is about 0.69 V. In Example 4, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about 0.46 V. When $\Delta V_{3-2}$ is about 10 V, the optimal electric difference ($\Delta V^*_{1-2}$) between the first electrode 111 and the second electrode 112 is about 1.90 V. By comparing Table 1 and Table 2, it may be found that the optimal potential differences ($\Delta V^*_{1-2}$) in Example 3 and Example 4 are respectively larger than the optimal potential differences ($\Delta V^*_{1-2}$) in Example 1 and Example 2 under the same $\Delta V_{3-2}$ condition. That is, when the sub-pixel structure does not include the planarization layer 126, the optimal potential difference ($\Delta V^*_{1-2}$) increases.

FIG. 8 is a diagram showing the relationship between $\Delta V_{3-2}$ and $\Delta V^*_{1-2}$ in connection with Example 3 and Example 4. In FIG. 8, curve A represents the result of Example 3, and the curve B represents the result of Example 4. The optimal potential difference ($\Delta V^*_{1-2}$) linearly increases along with the increase in the potential difference ($\Delta V_{3-2}$) between the third electrode 123 and the second electrode 112. The optimal potential difference ($\Delta V^*_{1-2}$) is located between the curve A and the curve B when the liquid crystal layer in the sub-pixel structure is about 3 µm to about 4 µm in thickness, the protective layer on the first substrate 110 is about 0.2 µm to about 0.6 µm in thickness, the alignment layer (PI) is about 0.04 µm to about 0.1 µm in thickness.

In other words, the optimal potential difference ($\Delta V^*_{1-2}$) varies and depends upon the sub-pixel structure. In this embodiment, when $\Delta V_{3-2}$ is about 3 V, the optimal potential difference ($\Delta V^*_{1-2}$) is about 0.17-0.46 V. When $\Delta V_{3-2}$ is about 4 V, the optimal potential difference ($\Delta V^*_{1-2}$) is about 0.26 V to about 0.71 V. When $\Delta V_{3-2}$ is about 5 V, the optimal potential difference ($\Delta V^*_{1-2}$) is about 0.34 V to about 0.94 V. When $\Delta V_{3-2}$ is about 6 V, the optimal potential difference ($\Delta V^*_{1-2}$) is about 0.42 V to about 1.15 V. When $\Delta V_{3-2}$ is about 7 V, the optimal potential difference ($\Delta V^*_{1-2}$) is about 0.49 V to about 1.135 V. When $\Delta V_{3-2}$ is about 8 V, the optimal potential difference ($\Delta V^*_{1-2}$) is about 0.56 V to about 1.54 V. When $\Delta V_{3-2}$ is about 9 V, the optimal potential difference ($\Delta V^*_{1-2}$) is about 0.62 V to about 1.73 V. When $\Delta V_{3-2}$ is about 10 V, the optimal potential difference ($\Delta V^*_{1-2}$) is about 0.69 V to about 1.9 V.

Third Embodiment

Figure 9:
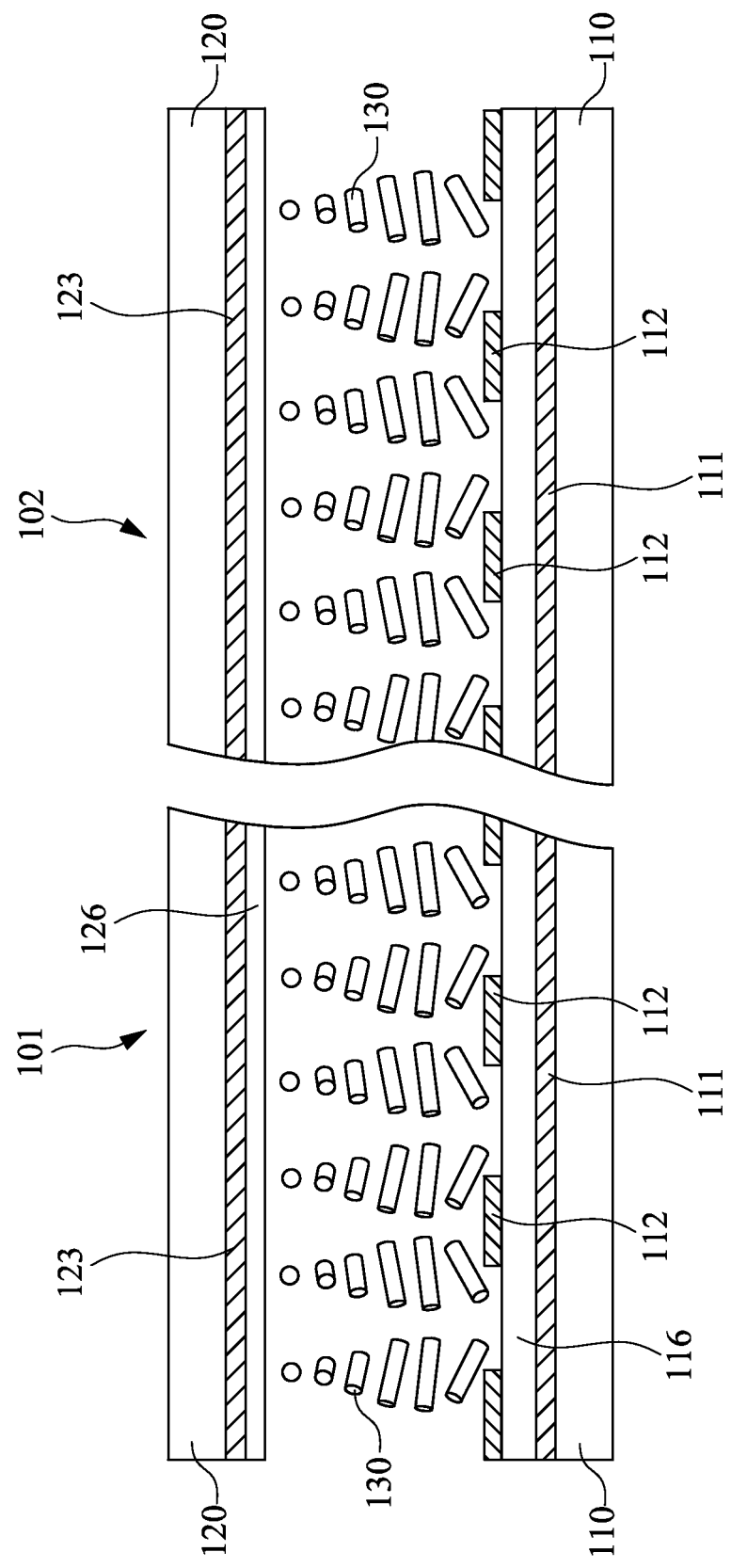
FIG. 9 is a cross-sectional view schematically illustrating a display device with an adjustable viewing angle according to a third embodiment of the present disclosure.

FIG. 9 is a cross-sectional view schematically illustrating a display device 200 with an adjustable viewing angle according to a third embodiment of the present disclosure. The display device 200 in this embodiment is similar to the display device 100 depicted in FIG. 2A, while the difference between the two display devices is the positions and shapes of the first electrode 111 and the second electrode 112. The first electrode 111 of the display device 200 acts as a pixel electrode and has no slit. The second electrode 112 acts as an electrode with an adjustable potential and having slit patterns (or namely slits), such as a common electrode. The second electrode 112 is positioned between the first electrode 111 and the third electrode 123. Other components and features of the display device 200 are the same as those described in the first embodiment. When the display device 200 is operated in the wide viewing angle mode, the potential difference between the second electrode 112 and the third electrode 123 is about zero; besides, in the wide viewing angle mode, the potential difference between the first electrode 111 and the second electrode 112 is about zero while the sub-pixel is at a gray level of zero (L0). When the display device 100 is operated in the narrow viewing angle mode, the potential difference between the second electrode 112 and the third electrode 123 in the sub-pixel is not zero; besides, in the narrow viewing angle mode, the potential difference between the first electrode 111 and the second electrode 112 is not equal to zero while the sub-pixel is at the gray level of zero (L0). In other words, in the narrow viewing angle mode, when the sub-pixel is at the gray level of zero, a non-zero potential difference exists between the first electrode 111 and the second electrode 112.

In this embodiment, when the display device 200 is operated in the narrow viewing angle mode, the potential of the first electrode 111 is substantially less than the potential of the second electrode 112 while the sub-pixel is at the gray level of zero. Particularly, the potential difference between the first electrode 111 and the second electrode 112 is about −0.04 V to about −1.18 V. $\Delta V^*_{1-2}$ refers to the potential of the first electrode 111 minus the potential of the second electrode 112 (unit: volt (V)). $\Delta V_{3-2}$ refers to the potential of the third electrode 123 minus the potential of the second electrode 112 (unit: volt (V)).

Table 3 below shows the optimal potential differences ($\Delta V^*_{1-2}$) of two examples according to this embodiment. The sub-pixel structure in Example 5 is the same as that described in Example 1 hereinbefore. The sub-pixel structure in Example 6 is the same as that described in Example 2 hereinbefore.

TABLE 3

| $\Delta V_{3-2}$ (V) | Example 5 $\Delta V^*_{1-2}$ (V) | Example 6 $\Delta V^*_{1-2}$ (V) |
| --- | --- | --- |
| 3 | −0.04 | −0.26 |
| 4 | −0.05 | −0.39 |
| 5 | −0.06 | −0.52 |
| 6 | −0.08 | −0.66 |
| 7 | −0.10 | −0.79 |
| 8 | −0.11 | −0.92 |
| 9 | −0.12 | −1.05 |
| 10 | −0.14 | −1.18 |

In Example 5, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about −0.04 V. When $\Delta V_{3-2}$ is about 10 V, the optimal potential difference ($\Delta V^*_{1-2}$) between the first electrode 111 and the second electrode 112 is about −0.14 V. In Example 6, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about −0.26 V. When $\Delta V_{3-2}$ is about 10 V, the optimal potential difference ($\Delta V^*_{1-2}$) between the first electrode 111 and the second electrode 112 is about −1.18 V.

In terms of structure, although the display device 200 in this embodiment is similar to the display device 100 in the first embodiment, the optimal potential difference ($\Delta V^*_{1-2}$) between the first electrode 111 and the second electrode 112 is significantly different. When the display device 200 is operated in the narrow viewing angle mode, the potential of the first electrode 111 should be substantially less than the potential of the second electrode 112 as the sub-pixel is at the gray level of zero, and then the optimal potential difference ($\Delta V^*_{1-2}$) can be obtained. When the potential difference between the first electrode 111 and the second electrode 112 at the gray level of zero is set equal to the optimal potential difference ($\Delta V^*_{1-2}$), and therefore the sub-pixel has the minimal on-axis brightness (i.e., the minimal light leakage in the dark state).

Figure 10:
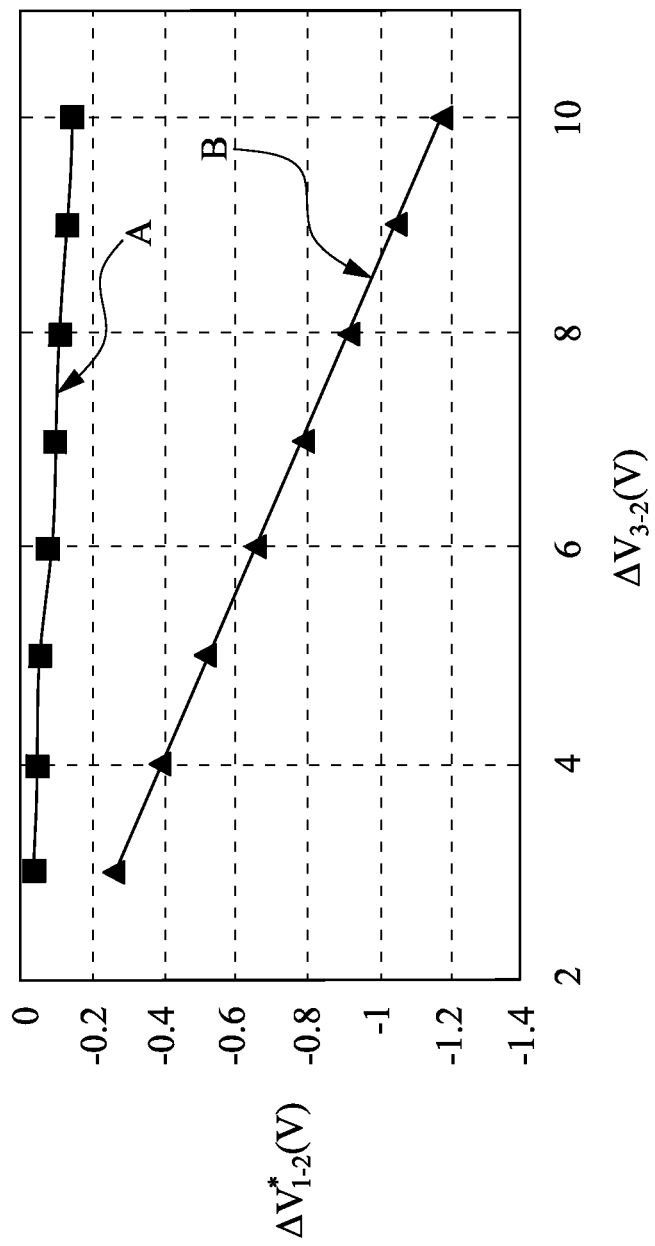
FIG. 10 is a diagram showing the relationship between $\Delta V_{3\text{-}2}$ and $\Delta V^*_{1\text{-}2}$ in connection with Example 5 and Example 6 of the present disclosure.

FIG. 10 is a diagram showing the relationship between $\Delta V_{3-2}$ and $\Delta V^*_{1-2}$ in connection with Example 5 and Example 6. In FIG. 10, the curve A represents the result of Example 5, and the curve B represents the result of Example 6. As described hereinbefore, the optimal potential difference ($\Delta V^*_{1-2}$) varies and depends upon the sub-pixel structure. In this embodiment, when $\Delta V_{3-2}$ is about 3 V, the optimal potential difference ($\Delta V^*_{1-2}$) is about −0.04 V to about −0.26 V. When $\Delta V_{3-2}$ is about 4 V, the optimal potential difference ($\Delta V^*_{1-2}$) is about −0.05 V to about −0.39 V. When $\Delta V_{3-2}$ is about 5 V, the optimal potential difference ($\Delta V^*_{1-2}$) is about −0.06 V to about −0.52 V. When $\Delta V_{3-2}$ is about 6 V, the optimal potential difference ($\Delta V^*_{1-2}$) is about −0.08 V to about −0.66 V. When $\Delta V_{3-2}$ is about 7 V, the optimal potential difference ($\Delta V^*_{1-2}$) is about −0.10 V to about −0.79 V. When $\Delta V_{3-2}$ is about 8 V, the optimal potential difference ($\Delta V^*_{1-2}$) is about −0.11 V to about −0.92 V. When $\Delta V_{3-2}$ is about 9 V, the optimal potential difference ($\Delta V^*_{1-2}$) is about −0.12 V to about −1.05 V. When $\Delta V_{3-2}$ is about 10 V, the optimal potential difference ($\Delta V^*_{1-2}$) is about −0.14 V to about −1.18 V.

Fourth Embodiment

The display device in the fourth embodiment has a structure similar to that in the third embodiment, except that the display device of this embodiment does not include the planarization layer 126 on the second substrate 120 (with reference to FIG. 9). In this embodiment, the potential difference between the first electrode 111 and the second electrode 112 is about −0.18 V to about −2.34 V (i.e., the potential of the first electrode 111 minus the potential of the second electrode 112). The first electrode 111 acts as the pixel electrode and has no slit. The second electrode 112 acts as the electrode with the adjustable potential and having slit patterns, such as the common electrode.

In Table 4 below, it shows the optimal potential differences ($\Delta V^*_{1-2}$) of two examples according to this embodiment. The sub-pixel structures in Example 7 and Example 8 are respectively the same as those described in Example 5 and Example 6, except that the sub-pixel structures in Example 7 and Example 8 do not include the planarization layer 126. $\Delta V_{3-2}$ refers to the potential of the third electrode 123 minus the potential of the second electrode 112 (unit: volt (V)); and $\Delta V^*_{1-2}$ refers to the potential of the first electrode 111 minus the potential of the second electrode 112 (unit: volt (V)).

TABLE 4

| $\Delta V_{3-2}$ (V) | Example 7 $\Delta V^*_{1-2}$ (V) | Example 8 $\Delta V^*_{1-2}$ (V) |
| --- | --- | --- |
| 3 | −0.18 | −0.64 |
| 4 | −0.28 | −0.95 |
| 5 | −0.37 | −1.22 |
| 6 | −0.45 | −1.47 |
| 7 | −0.52 | −1.70 |
| 8 | −0.59 | −1.92 |
| 9 | −0.65 | −2.13 |
| 10 | −0.72 | −2.34 |

In Example 7, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about −0.18 V. When $\Delta V_{3-2}$ is about 10 V, the optimal potential difference ($\Delta V^*_{1-2}$) between the first electrode 111 and the second electrode 112 is about −0.72 V. In Example 8, when the potential difference ($\Delta V_{3-2}$) between the third electrode 123 and the second electrode 112 is about 3 V, the optimal potential difference ($\Delta V^*_{1-2}$) between the first electrode 111 and the second electrode 112 is about −0.64 V. When $\Delta V_{3-2}$ is about 10 V, the optimal potential difference ($\Delta V^*_{1-2}$) between the first electrode 111 and the second electrode 112 is about −2.34 V.

Figure 11:
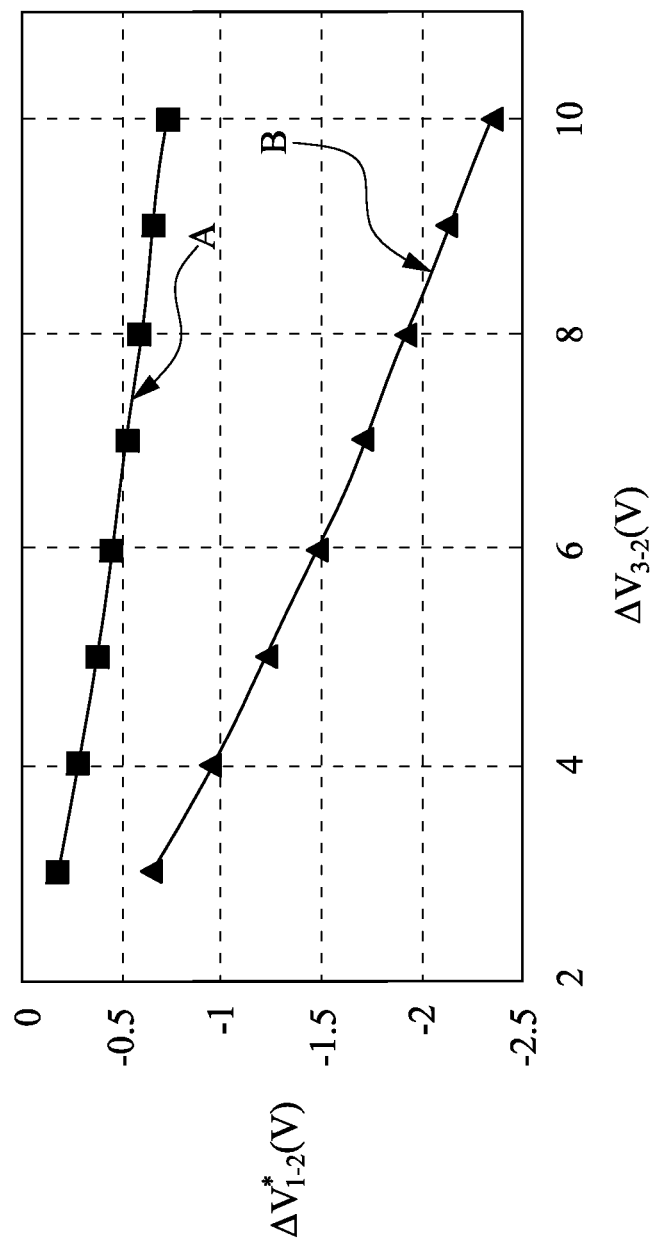
FIG. 11 is a diagram showing the relationship between $\Delta V_{3\text{-}2}$ and $\Delta V^*_{1\text{-}2}$ in connection with Example 7 and Example 8 of the present disclosure.

FIG. 11 is a diagram showing the relationship between $\Delta V_{3-2}$ and $\Delta V^*_{1-2}$ in connection with Example 7 and Example 8. In FIG. 11, curve A represents the result of Example 7; and curve B represents the result of Example 8. As described above, the optimal potential difference ($\Delta V^*_{1-2}$) varies and depends upon the sub-pixel structure. In this embodiment, when $\Delta V_{3-2}$ is about 3 V, the optimal potential difference ($\Delta V^*_{1-2}$) is about −0.18 V to about −0.64 V. When $\Delta V_{3-2}$ is about 4 V, the optimal potential difference ($\Delta V^*_{1-2}$) is about −0.28 V to about −0.95 V. When $\Delta V_{3-2}$ is about 5 V, the optimal potential difference ($\Delta V^*_{1-2}$) is about −0.37 V to about −1.22 V. When $\Delta V_{3-2}$ is about 6 V, the optimal potential difference ($\Delta V^*_{1-2}$) is about −0.45 V to about −1.47 V. When $\Delta V_{3-2}$ is about 7 V, the optimal potential difference ($\Delta V^*_{1-2}$) is about −0.52 V to about −1.70 V. When $\Delta V_{3-2}$ is about 8 V, the optimal potential difference ($\Delta V^*_{1-2}$) is about −0.59 V to about −1.92 V. When $\Delta V_{3-2}$ is about 9 V, the optimal potential difference ($\Delta V^*_{1-2}$) is about −0.65 V to about −2.13 V. When $\Delta V_{3-2}$ is about 10 V, the optimal potential difference ($\Delta V^*_{1-2}$) is about −0.72 V to about −2.34 V.

Fifth Embodiment

Figure 12A:
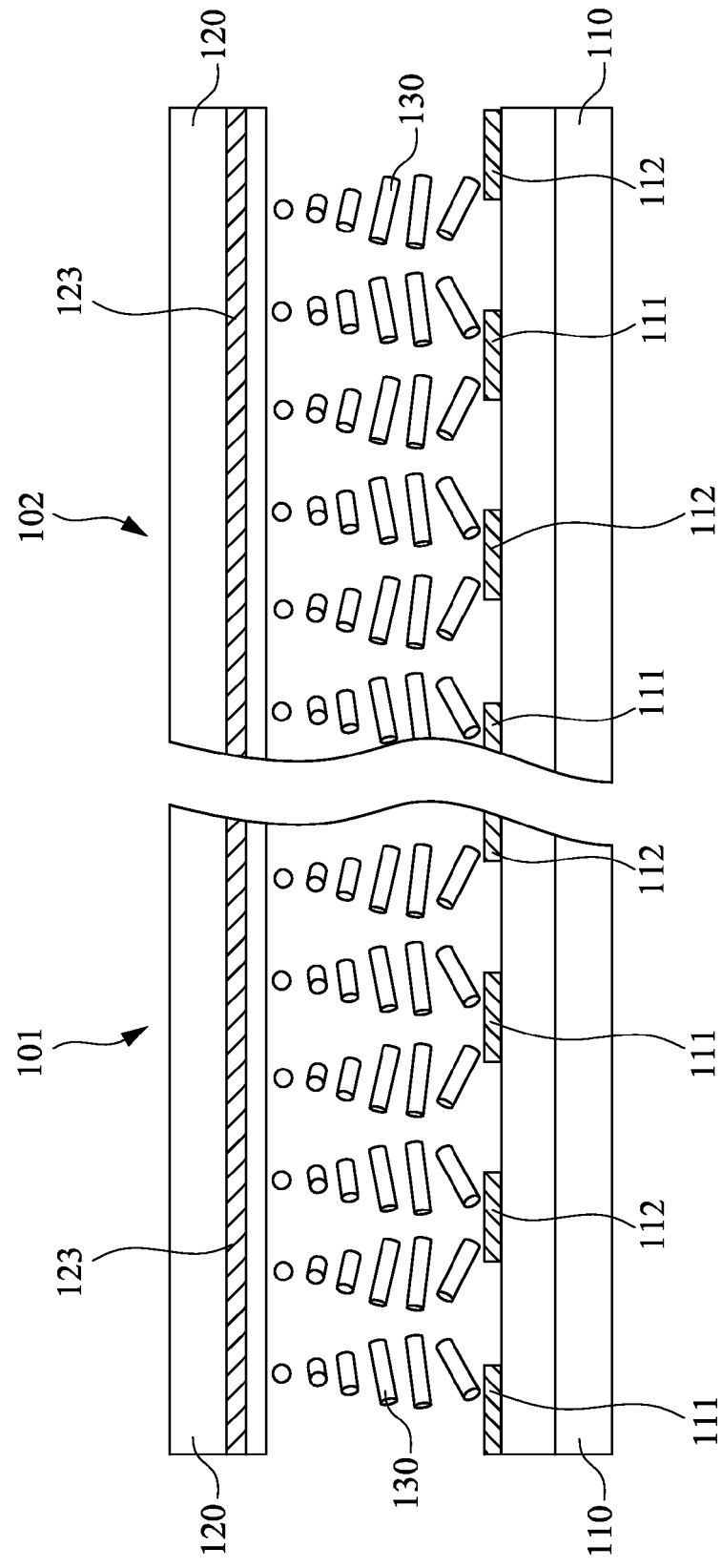
FIGS. 12A and 12B are cross-sectional views schematically illustrating a display device with an adjustable viewing angle according to still another embodiment of the present disclosure.
Figure 12B:
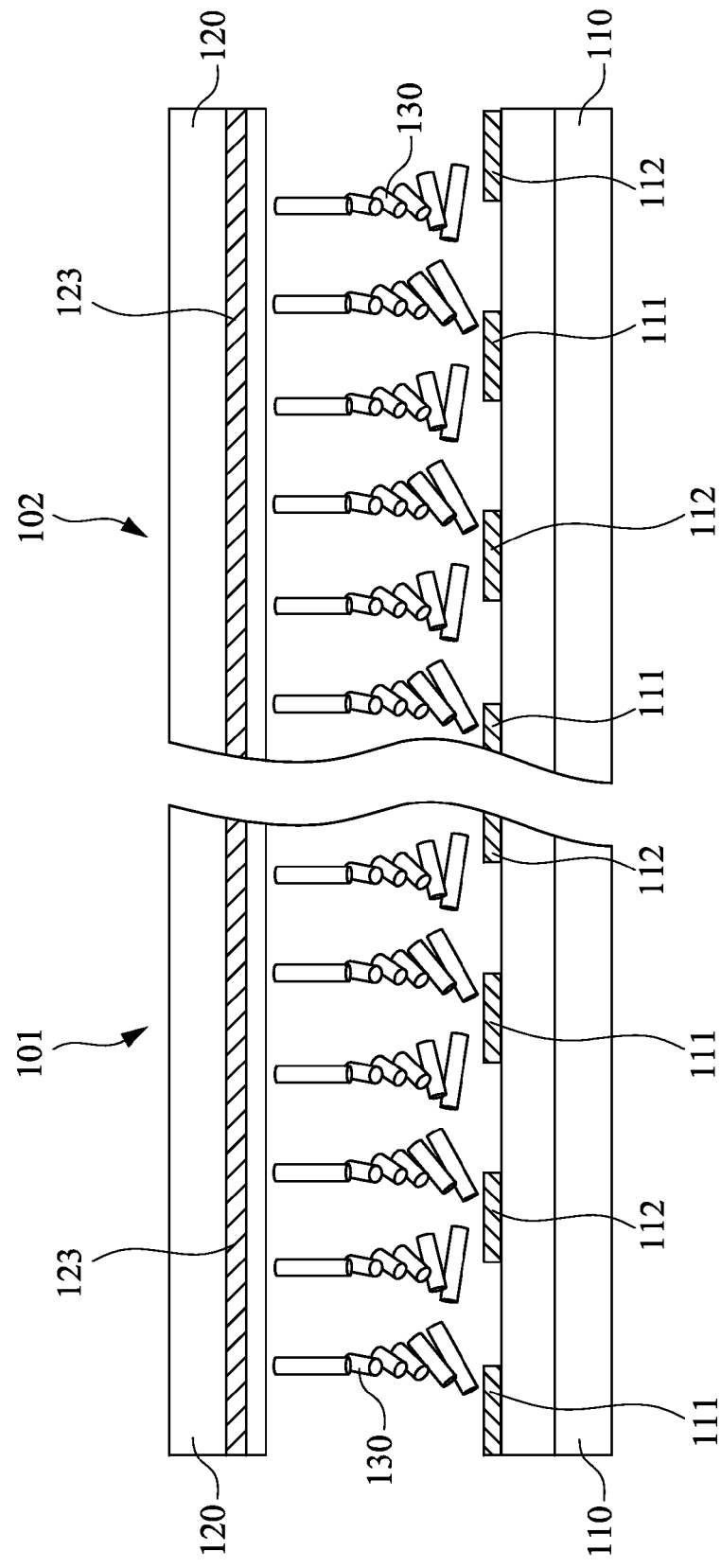

FIG. 12A is a cross-sectional view schematically illustrating a display device 300 with an adjustable viewing angle according to a fifth embodiment of the present disclosure. The display device 300 in this embodiment is similar to the display device 100 depicted in FIG. 2A in structure, in which the difference between the two display devices is the positions and shapes of the first electrode 111 and the second electrode 112. The first electrode 111 of the display device 300 has slit patterns, and the second electrode 112 has slit patterns as well. The first electrode 111 and the second electrode 112 are alternately arranged (or referred to as staggered disposition). Both the first electrode 111 and the second electrode 112 are disposed on the same surface of the dielectric layer 116, which means both the first electrode 111 and the second electrode 112 are disposed on an identical level. One of the first electrode 111 and the second electrode 112 acts as the pixel electrode whereas other one of the first electrode 111 and the second electrode 112 acts as the electrode with an adjustable potential, such as a common potential, a ground potential, or a potential far less than that of the pixel electrode. In this embodiment, the following cases are taken as examples: the first electrode 111 acts as the pixel electrode, and the second electrode 112 acts as the electrode with the adjustable potential, such as the common potential, which may be referred to as the common electrode. In other embodiments, the first electrode 111 may be the electrode with the adjustable potential, such as the common potential, which may be referred to as the common electrode; and the second electrode 112 acts as the pixel electrode. In other design manners, reference can be made to the first embodiment. Other components and features of the display device 300 in this embodiment are the same as those described in the first embodiment hereinbefore. In the examples where the non-self-luminous display medium layer 130 is liquid crystal molecules (the non-self-luminous display medium layer 130 of the present disclosure is not limited to liquid crystal molecules), the orientation of the liquid crystal molecules therein is schematically shown in FIG. 12A when the display device 300 is operated in the wide viewing angle mode. In contrast, when the display device 100 is operated in the narrow viewing angle mode, the orientation of liquid crystal molecules therein is schematically as shown in FIG. 12B. Accordingly, the orientation and the twist state of the liquid crystal molecules 130 from the first substrate 110 to the second substrate 120 in the wide viewing angle mode shown in FIG. 12A significantly differ from that in the narrow viewing angle mode shown in FIG. 12B. In this embodiment, the optimal potential difference between the first electrode 111 and the second electrode 112 is about 0.22 V to about 1.2 V.

Figure 13:
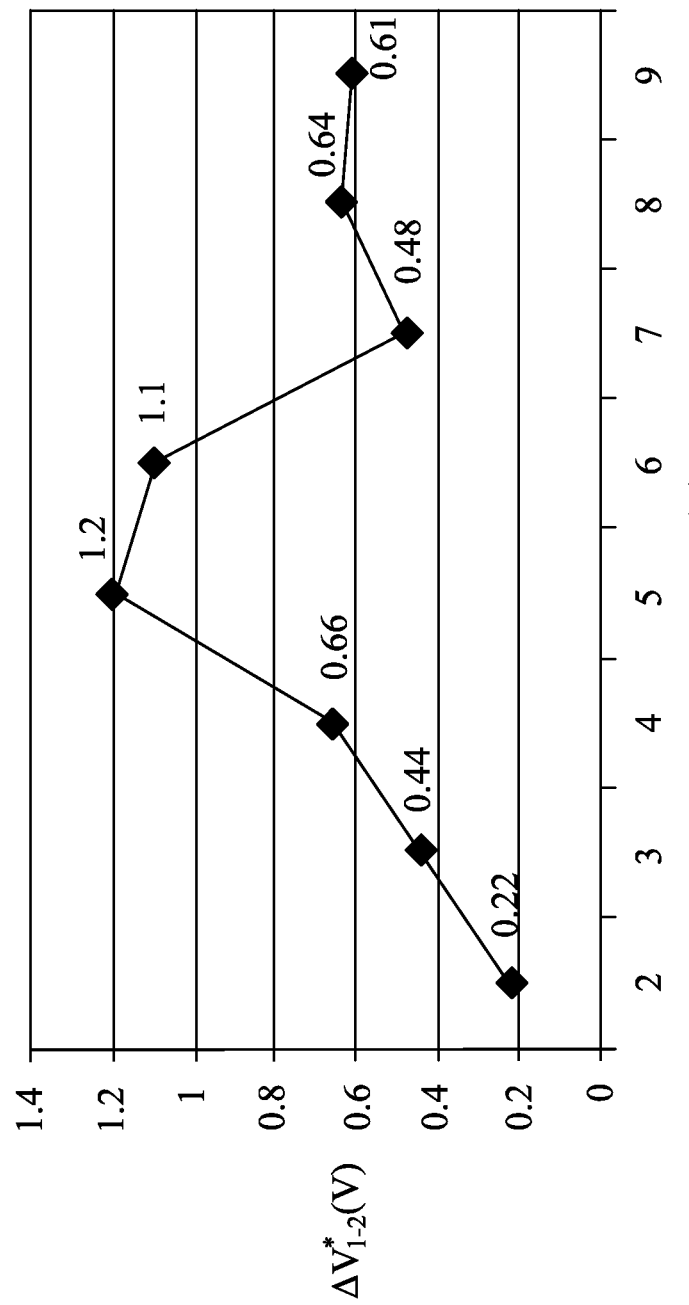
FIG. 13 is a diagram showing the relationship between $\Delta V_{3\text{-}2}$ and $\Delta V^*_{1\text{-}2}$ according to still another embodiment of the present disclosure.

FIG. 13 is a diagram showing the relationship between $\Delta V_{3-2}$ and $\Delta V^*_{1-2}$ according to this embodiment. In this embodiment, for instance, the display medium layer 130 is the liquid crystal layer with a thickness of about 3.6 micron (μm), the planarization layer 126 is about 3 μm in thickness and the dielectric coefficient thereof is about 3.5 (unit: none), and the protective layer (not shown) on the first substrate 110 has a thickness of about 0.4 μm and the dielectric coefficient thereof is about 6.65 (unit: none). In this embodiment, when $\Delta V_{3-2}$ is about 2 V to about 9 V, $\Delta V^*_{1-2}$ is about 0.22 V to about 1.2 V.

According to another aspect of the present disclosure, a driving method for driving the display device with an adjustable viewing angle is provided. The method includes the steps described below.

Firstly, a display device of any example or embodiment described hereinbefore is provided. Particularly, the display device includes a display panel 100a comprised of a first substrate 110, a second substrate 120 and a non-self-luminous display medium layer 130. The second substrate 120 is disposed opposite to the first substrate 110, and the non-self-luminous display medium layer 130 is interposed between the first substrate 110 and the second substrate 120. A pixel array 100b is defined in the display panel 100a, in which the pixel array 100b has at least one first pixel zone D1 and at least one second pixel zone D2. The first pixel zone D1 and the second pixel zone D2 respectively have at least one first sub-pixel and at least one second sub-pixel. The display device further includes a first electrode 111, a second electrode 112, and a third electrode 123. For example, the first electrode 111 is disposed on the first substrate 110 and arranged in the first sub-pixel 101 and the second sub-pixel 102 in both the first pixel zone D1 and the second pixel zone D2. In other words, the first electrode 111 is disposed in aforesaid (all/these) sub-pixels 101 and aforesaid (all/these) sub-pixels 102 in aforesaid (all/these) pixel zone D1 and pixel zone D2. The second electrode 112 is disposed on the first substrate 110 and arranged in the first sub-pixel 101 and the second sub-pixel 102 in both the first pixel zone D1 and the second pixel zone D2. In other words, the second electrode 112 is disposed in aforesaid (all/these) sub-pixels 101 and aforesaid (all/these) sub-pixels 102 in aforesaid (all/these) pixel zone D1 and pixel zone D2. Furthermore, the first electrode 111 and the second electrode 112 in aforesaid (all/these) sub-pixels 101 and 102 in the aforesaid (all/these) pixel zones D1 and D2 are spaced apart from each other. In other words, the first electrode 111 in all the sub-pixels (101 and 102) is not in contact with the second electrode 112 in all the sub-pixels (101 and 102). The third electrode 123 is disposed on the second substrate 120 and arranged in the first sub-pixel 101 and the second sub-pixel 102 in both the first pixel zone D1 and the second pixel zone D2. In addition, the third electrode in all the sub-pixels (101 and 102) is not in contact with the first electrode 111 and the second electrode 112 in all sub-pixels (101 and 102). In other words, the third electrode 123 is disposed in the aforesaid (all/these) sub-pixels 101 and 102 in the aforesaid (all/these) pixel zones D1 and D2. Therefore, the third electrode 123 is spaced apart from the first electrode 111 and the second electrode 112 by the non-self-luminous display medium layer 130, and the third electrode 123 does not contact the first electrode 111 and the second electrode 112. That is, the non-self-luminous display medium layer 130 is interposed between the third electrode 123 and each of the first electrode 111 and the second electrode 112. One of the first electrode 111 and the second electrode 112 acts as the pixel electrode, and the other one of the first electrode 111 and the second electrode 112 acts as the electrode with the adjustable potential, such as the common potential, the ground potential, or the potential far less than that of the pixel electrode. For the related details and morphologies of the first electrode 111 and the second electrode 112, references can be made to the embodiments described hereinbefore.

Thereafter, a first potential, a second potential, and a third potential are respectively applied to the first electrode 111, the second electrode 112, and the third electrode 123 in the aforementioned sub-pixels. When the display device 100 is operated in a narrow viewing angle mode, the potential difference between the second electrode 112 and the third electrode 123 in the aforementioned sub-pixels is not zero, and a potential difference between the first electrode 111 and the second electrode 112 is not zero when the sub-pixels are at a gray level of zero. Furthermore, for related details or curves of $\Delta V_{3-2}$ and $\Delta V^*_{1-2}$, references can be made to each of the aforementioned embodiments, which will not be further described herein. $\Delta V_{3-2}$ refers to the potential of the third electrode 123 minus the potential of the second electrode 112; and $\Delta V^*_{1-2}$ refers to the potential of the first electrode 111 minus the potential of the second electrode 112.

Figure 14:
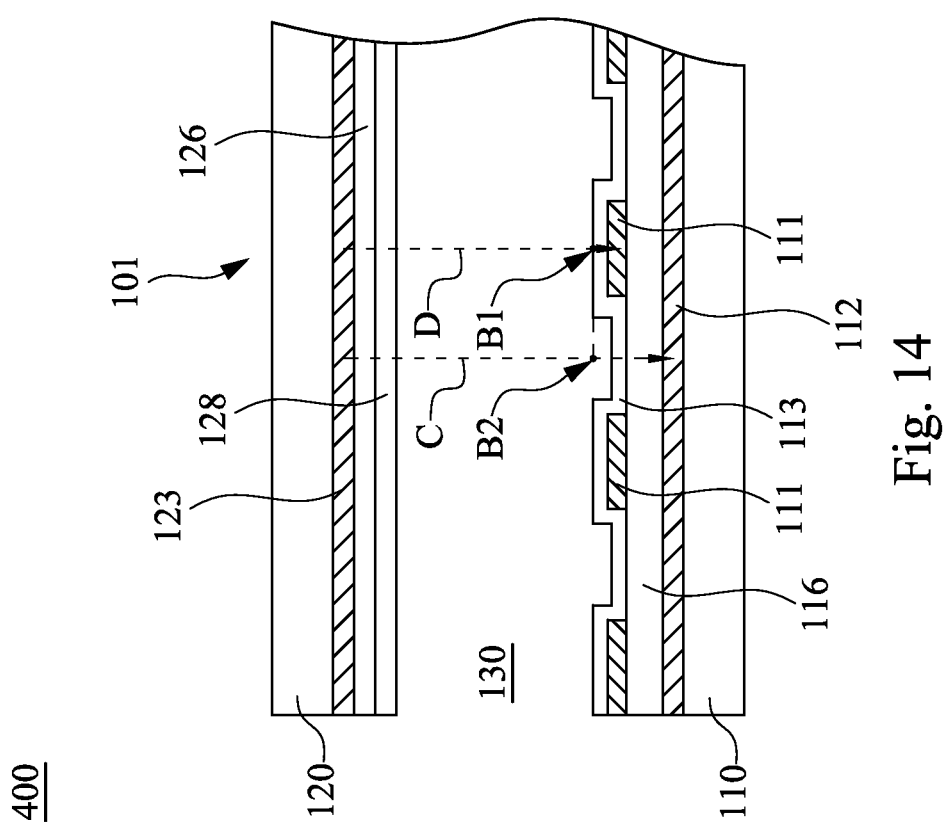
FIG. 14 is a cross-sectional view schematically illustrating a display device with an adjustable viewing angle in one embodiment of the present disclosure.

An electrical analysis model according to one embodiment of the present disclosure is provided hereinafter, in order to enable a skilled person in the art to appreciate the technical contents of the present disclosure. The analysis methods, and physical principles and calculation disclosed hereinafter should not be interpreted as limitation of the present disclosure in any ways. Hereinafter, a display device 400 depicted in FIG. 14 will be taken as an example for the electrical analysis. The display device 400 depicted in FIG. 14 is similar to the display device 100, in which the difference between the two display devices is that the display device 400 further includes an alignment layer 113 and an alignment layer 128. The alignment layer 113 covers the dielectric layer 116 and all the first electrodes 111, and the alignment layer 128 covers the planarization layer 126. In the electrical analysis below, the following conditions are taken as examples: the first electrode 111 acts as the to pixel electrode, the second electrode 112 acts as the common electrode on the first substrate 110, and the third electrode 123 acts as the common electrode on the second substrate 120.

On a path C that is marked in FIG. 14, i.e., there is no first electrode 111 present on the path C, by which an equation (1) is derived as follow:

$$\Delta V_{Tcom-Bcom} = I^* \cdot (Z_{OC} + Z_{PI\_Top} + Z_{LC^*} + Z_{PI\_Bottom^*} + Z_{PV}); \quad (1)$$

$$I^* = \frac{\Delta V_{Tcom-Bcom}}{(Z_{OC} + Z_{PI\_Top} + Z_{LC^*} + Z_{PI\_Bottom^*} + Z_{PV})}$$

wherein $\Delta V_{Tcom-Bcom}$ represents the potential $V_{Tcom}$ of the third electrode 123 minus the potential $V_{Bcom}$ of the second electrode 112, i.e., $\Delta V_{Tcom-Bcom} = V_{Tcom} - V_{Bcom}$ (unit: volt (V));

$I^*$ represents the current from the third electrode 123 to the second electrode 112, passing by the path C (unit: ampere (A));

$Z_{OC}$ represents the electrical impedance of the planarization layer 126 (unit: ohmic ($\Omega$));

$Z_{PI\_Top}$ represents the electrical impedance of the alignment layer 128;

$Z_{LC^*}$ represents the electrical impedance of the display medium layer 130 on the path C;

$Z_{PI\_Bottom^*}$ represents the electrical impedance of the alignment layer 113 on the path C;

$Z_{PV}$ represents the electrical impedance of the dielectric layer 116.

In FIG. 14, the position B1 is located on the alignment layer 113. The position B2 and the position B1 are located at the same height relative to the dielectric layer 116. When the potential at the position B1 shown in FIG. 14 equals to the potential at the position B2 shown in FIG. 14, it suggests that the position B1 and the position B2 are on an identical equipotential curve, and therefore the display device 400 has the minimal on-axis light leakage in the dark state. Therefore, an equation (2) is derived as follow:

$$V_{PI\_Bottom} - V_{Bcom} = V^* - V_{Bcom} \quad (2)$$

wherein $V_{PI\_Bottom}$ represents the potential of the alignment layer 113 at the position B1 shown in FIG. 14 (unit: volt (V));

$V_{Bcom}$ represents the potential of the second electrode 112;

$V^*$ represents the potential at the position B2 shown in FIG. 14.

In the equation (2), $(V^* - V_{Bcom})$ may be expressed by the following equation (3):

$$V^* - V_{Bcom} = I^* \cdot (Z_{LC(V^*-PI\_Bottom^*)} + Z_{PI\_Bottom^*} + Z_{PV}) \quad (3)$$

wherein $Z_{LC(V^*-PI\_Bottom^*)}$ represents the electrical impedance of the liquid crystal layer between the position B2 and the alignment layer 113 beneath the position B2.

An equation (4) is derived from the equation (1), the equation (2) and the equation (3) as follows:

$$\begin{aligned}V_{PI\_Bottom} - V_{Bcom} &= V^* - V_{Bcom} \\ &= I^* \cdot (Z_{LC(V^*-PI\_Bottom^*)} + Z_{PI\_Bottom^*} + Z_{PV}) \\ &= \frac{\Delta V_{Tcom-Bcom} \cdot \left( \begin{array}{c} Z_{LC(V^*-PI\_Bottom^*)} + \\ Z_{PI\_Bottom^*} + Z_{PV} \end{array} \right)}{(Z_{OC} + Z_{PI\_Top} + Z_{LC^*} + Z_{PI\_Bottom^*} + Z_{PV})} \end{aligned} \quad (4)$$

$$V_{PI\_Bottom} = V_{Bcom} + \frac{\Delta V_{Tcom-Bcom} \cdot \left( \begin{array}{c} Z_{LC(V^*-PI\_Bottom^*)} + \\ Z_{PI\_Bottom^*} + Z_{PV} \end{array} \right)}{(Z_{OC} + Z_{PI\_Top} + Z_{LC^*} + Z_{PI\_Bottom^*} + Z_{PV})}$$

Furthermore, on the path D shown in FIG. 14, an equation (5) is derived as follow:

$$\Delta V_{Tcom-PI\_Bottom} \equiv V_{Tcom} - V_{PI\_Bottom} = I \cdot (Z_{OC} + Z_{PI\_Top} + Z_{LC}) \quad (5)$$

wherein $V_{Tcom}$ represents the potential of the third electrode 123;

$V_{PI\_Bottom}$ represents the potential of the alignment layer 113 at the position B1 shown in FIG. 14, which is the same as the equation (2);

$\Delta V_{Tcom-PI\_Bottom}$ is defined as $(V_{Tcom} - V_{PI\_Bottom})$;

I represents the current from the third electrode 123 to the first electrode 111, passing by the path D;

$Z_{LC}$ represents the electrical impedance of the display medium layer 130 on the path D.

$V_{PI\_Bottom}$ of the equation (4) is substituted into the equation (5) and an equation (6) is derived as follow:

$$I = \frac{\Delta V_{Tcom-Bcom}}{(Z_{OC} + Z_{PI\_Top} + Z_{LC})} \left[ 1 - \frac{(Z_{LC(V^*-PI\_Bottom^*)} + Z_{PI\_Bottom^*} + Z_{PV})}{(Z_{OC} + Z_{PI\_Top} + Z_{LC^*} + Z_{PI\_Bottom^*} + Z_{PV})} \right] \quad (6)$$

Furthermore, on the path D shown in FIG. 14, an equation (7) may also be derived as follow:

$$\Delta V_{Tcom-px} \equiv V_{Tcom} - V_{px} = I \cdot (Z_{OC} + Z_{LC} + Z_{PI\_Top} + Z_{PI\_Bottom}) \quad (7)$$

wherein $V_{px}$ represents the potential of the first electrode 111;

$Z_{PI\_Bottom}$ represents the electrical impedance of the alignment layer 113 on the path D.

The equation (6) is substituted into the equation (7) to derive the following equation (8):

$$V_{px} = V_{Tcom} - \frac{(V_{Tcom} - V_{Bcom}) \cdot (Z_{OC} + Z_{LC} + Z_{PI\_Top} + Z_{PI\_Bottom})}{(Z_{OC} + Z_{PI\_Top} + Z_{LC})} \quad (8)$$

$$\left[1 - \frac{(Z_{LC(V^*-PI\_Bottom^*)} + Z_{PI\_Bottom^*} + Z_{PV})}{(Z_{OC} + Z_{PI\_Top} + Z_{LC^*} + Z_{PI\_Bottom^*} + Z_{PV})}\right]$$

The electrical impedances, $Z_{OC}$, $Z_{LC}$, $Z_{PI\_Top}$, $Z_{PI\_Bottom}$, $Z_{LC(V^*-PI\_Bottom)}$, $Z_{PI\_Bottom^*}$, $Z_{PV}$, and $Z_{LC^*}$ in various layers in the equation (8) are represented by capacitance values C (unit: farad (F)) in various layers, i.e.

$$Z = \frac{1}{(j\omega C)},$$

wherein j is imaginary unit, ω is frequency (unit: hertz (Hz)), by which an equation (9) is derived as follow:

$$V_{px} = V_{Tcom} - \frac{(V_{Tcom} - V_{Bcom}) \cdot (C_{OC}^{-1} + C_{LC}^{-1} + C_{PI\_Top}^{-1} + C_{PI\_Bottom}^{-1})}{(C_{OC}^{-1} + C_{PI\_Top}^{-1} + C_{LC}^{-1})} \quad (9)$$

$$\left[1 - \frac{(C_{LC(V^*-PI\_Bottom^*)}^{-1} + C_{PI\_Bottom^*}^{-1} + C_{PV}^{-1})}{(C_{OC}^{-1} + C_{PI\_Top}^{-1} + C_{LC^*}^{-1} + C_{PI\_Bottom^*}^{-1} + C_{PV}^{-1})}\right]$$

The equation (9) may be rewrote to the following equation (10):

$$V_{px} = V_{Tcom} - \Delta V_{Tcom-Bcom} \times a \times b \quad (10)$$

wherein $$a = \frac{(C_{OC}^{-1} + C_{LC}^{-1} + C_{PI\_Top}^{-1} + C_{PI\_Bottom}^{-1})}{(C_{OC}^{-1} + C_{PI\_Top}^{-1} + C_{LC}^{-1})}$$

$$b = 1 - \frac{(C_{LC(V^*-PI\_Bottom^*)}^{-1} + C_{PI\_Bottom^*}^{-1} + C_{PV}^{-1})}{(C_{OC}^{-1} + C_{PI\_Top}^{-1} + C_{LC^*}^{-1} + C_{PI\_Bottom^*}^{-1} + C_{PV}^{-1})}$$

In accordance with the equation (10), the potential $V_{px}$ of the first electrode 111 is related to $\Delta V_{Tcom-Bcom}$, in which the parameters a and b in the equation (10) are only associated with the pixel structure. $V_{px}$ calculated from the equation (10) is consistent with the experimental results of Examples 1-8 in the first to fourth embodiments described hereinbefore.

The examples and embodiments of the present disclosure are described in a manner that the pixel array 100b includes at least one first pixel zone D1 (zone) and at least one second pixel zone D2. In other embodiments, the pixel array 100b may include only at least one first pixel zone D1 or only at least one second pixel zone D2. For relative details on the electrodes, the potential differences, and the slits, etc. of the pixel zone D1 or the pixel zone D2, reference can be made to the embodiments described hereinbefore, and that is not be further described herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An adjustable viewing angle display device, comprising:
a first substrate;
a second substrate disposed opposite to the first substrate;
a non-self-luminous display medium layer interposed between the first substrate and the second substrate to form a display panel;
a pixel array defined in the display panel, wherein the pixel array at least has one first pixel zone and one second pixel zone, and each of the first and the second pixel zones at least has one first sub-pixel and one second sub-pixel;
a first electrode disposed on the first substrate in all of the sub-pixels of the first and second pixel zones;
a second electrode disposed on the first substrate in all of the sub-pixels in the first and second pixel zones, wherein the first electrode disposed in the all of the sub-pixels in the first pixel zone is spaced apart from the second electrode disposed in all of the sub-pixels in the first pixel zone and the first electrode disposed in the all of the sub-pixels in the second pixel zone is spaced apart from the second electrode disposed in all of the sub-pixels in the second pixel zone; and
a third electrode disposed on the second substrate in all of the sub-pixels in the first and second pixel zones; wherein
when the display device is operated in a narrow viewing angle mode, a potential difference between the second and the third electrodes disposed within all of the sub-pixels in the first and second pixel zones is not equal to zero; and a potential difference between the first electrode and the second electrode disposed in the first and second pixel zones is not equal to zero when all of the sub-pixels are at a gray level of zero.

2. The adjustable viewing angle display device of claim 1, wherein one of the first electrode and the second electrode in each the sub-pixels has a plurality of slits.

3. The adjustable viewing angle display device of claim 1, wherein when the display device is operated in the narrow viewing angle mode, a potential of the first electrode disposed in all of the sub-pixels in the first and second pixel zones is greater than a potential of the second electrode disposed in all of the sub-pixels in the first and second pixel zones when all of the sub-pixels in the first and second pixel zones are at the gray level of zero.

4. The adjustable viewing angle display device of claim 3, wherein the potential difference between the first electrode and the second electrode is about 0.04 V to about 1.04 V.

5. The adjustable viewing angle display device of claim 3, wherein the potential difference between the first electrode and the second electrode is about 0.18 V to about 1.9 V.

6. The adjustable viewing angle display device of claim 1, wherein, when the display device is operated in the narrow viewing angle mode, a potential of the first electrode disposed in all of the sub-pixels in the first and second pixel zones is less than a potential of the second electrode disposed in all of the sub-pixels in the first and second pixel zones when all of the sub-pixels in the first and second pixel zones are at the gray level of zero.

7. The adjustable viewing angle display device of claim 6, wherein the potential difference between the first electrode and the second electrode is about −0.04 V to about −1.18 V.

8. The adjustable viewing angle display device of claim 6, wherein the potential difference between the first electrode and the second electrode is about −0.18 V to about −2.34 V.

9. The adjustable viewing angle display device of claim 1, wherein the potential difference between the second electrode and the third electrode is about 2 V to about 10 V.

10. A method for driving an adjustable viewing angle display device, comprising:
providing a display device, comprising:
  a first substrate;
  a second substrate disposed opposite to the first substrate;
  a non-self-luminous display medium layer interposed between the first substrate and the second substrate to form a display panel;
  a pixel array defined in the display panel, wherein the pixel array at least has one first pixel zone and one second pixel zone, and each of the first and the second pixel zones at least has one first sub-pixel and one second sub-pixel;
  a first electrode disposed on the first substrate in all of the sub-pixels in the first and second pixel zones;
  a second electrode disposed on the first substrate in all of the sub-pixels in the first and second pixel zones, wherein the first electrode disposed in all of the sub-pixels in the first pixel zones is spaced apart from the second electrode disposed in all of the sub-pixels in the first pixel zones and the first electrode disposed in the all of the sub-pixels in the second pixel zone is spaced apart from the second electrode disposed in all of the sub-pixels in the second pixel zone; and
  a third electrode disposed on the second substrate in all of the sub-pixels in the first and second pixel zones; and
respectively applying a first potential, a second potential, and a third potential to the first electrode, the second electrode and the third electrode in all of the sub-pixels in the first second pixel zones, wherein
when the display device is operated in a narrow viewing angle mode, a potential difference between the second and the third electrodes disposed in all of the sub-pixels in the first and second pixel zones is not equal to zero; and a potential difference between the first electrode and the second electrode disposed in the first and second pixel zones is not equal to zero when all of the sub-pixels are at a gray level of zero.

11. The driving method of claim 10, wherein one of the first electrode and the second electrode in each the sub-pixels has a plurality of slits.

12. The driving method of claim 10, wherein when the display device is operated in the narrow viewing angle mode, a potential of the first electrode disposed in all of the sub-pixels in the first and second pixel zones is greater than a potential of the second electrode disposed in all of the sub-pixels in the first and second pixel zones when all the sub-pixels are in the first and second pixel zones at the gray level of zero.

13. The driving method of claim 12, wherein the potential difference to between the first electrode and the second electrode is about 0.04 V to about 1.04 V.

14. The driving method of claim 12, wherein the potential difference between the first potential and the second potential is about 0.18 V to about 1.9 V.

15. The driving method in claim 10, wherein when the display device is operated in the narrow viewing angle mode, a potential of the first electrode disposed in all of the sub-pixels in the first and second pixel zones is less than a potential of the second electrode disposed in all of the sub-pixels in the first and second pixel zones when all of the sub-pixels in the first and second pixel zones are at the gray level of zero.

16. The driving method of claim 15, wherein the potential difference between the first potential and the second potential is about −0.04 V to about −1.18 V.

17. The driving method of claim 15, wherein the potential difference between the first potential and the second potential is about −0.18 V to about −2.34 V.

18. The driving method of claim 10, wherein the potential difference to between the second electrode and the third electrode is about 2 V to about 10 V.

* * * * *